US011157765B2

(12) United States Patent
Agrawal

(10) Patent No.: US 11,157,765 B2
(45) Date of Patent: Oct. 26, 2021

(54) METHOD AND SYSTEM FOR DETERMINING PHYSICAL CHARACTERISTICS OF OBJECTS

(71) Applicant: Samsung Electronics Co., Ltd., Suwon-si (KR)

(72) Inventor: Sachin Kumar Agrawal, Noida (IN)

(73) Assignee: Samsung Electronics Co., Ltd., Suwon-si (KR)

(*) Notice: Subject to any disclaimer, the term of this patent is extended or adjusted under 35 U.S.C. 154(b) by 33 days.

(21) Appl. No.: 16/689,581

(22) Filed: Nov. 20, 2019

(65) Prior Publication Data

US 2020/0160090 A1 May 21, 2020

(30) Foreign Application Priority Data

Nov. 21, 2018 (IN) .............................. 201841043788

(51) Int. Cl.
*G06K 9/62* (2006.01)
*G06T 7/60* (2017.01)
(Continued)

(52) U.S. Cl.
CPC ....... *G06K 9/6201* (2013.01); *G06F 3/04883* (2013.01); *G06T 5/002* (2013.01); *G06T 7/60* (2013.01); *G06T 7/70* (2017.01); *G06T 7/90* (2017.01); *G06F 3/016* (2013.01); *G06K 2209/27* (2013.01); *G06T 2207/20081* (2013.01); *G06T 2207/20084* (2013.01)

(58) Field of Classification Search
CPC ............. G06K 9/6201; G06K 2209/27; G06K 9/00979; G06K 9/00671; G06K 9/6271; G06T 7/60; G06T 7/70; G06T 7/90; G06T 5/002; G06T 2207/20081; G06T 2207/20084; G06T 2207/20076; G06T 2207/20016; G06T 2207/10024; G06T 2207/20224; G06T 7/00; G06F 3/04883; G06F 3/016; G06F 3/017
See application file for complete search history.

(56) References Cited

U.S. PATENT DOCUMENTS 5,426,684 A 6/1995 Gaborski et al.
6,069,918 A 5/2000 Mayer et al.
(Continued)

OTHER PUBLICATIONS

Ongun et al. "Paire 3D Model Generation with Conditional Generative Adversarial Networks", Computer Vision—ECCV 2018 Workshops, Sep. 8-14, 2018, pp. 473-487 (Year: 2018).*

*Primary Examiner* — Qian Yang
(74) *Attorney, Agent, or Firm* — Jefferson IP Law, LLP

(57) ABSTRACT

A method for determining a physical characteristic of an object is provided. The method includes recognizing, by an electronic device, an object in a candidate image. Further, the method includes extracting, by the electronic device, a plurality of candidate parameters of the recognized object in the candidate image. Further, the method includes determining, by the electronic device, physical characteristics of at least one portion of the recognized object in the candidate image by comparing the plurality of candidate parameters with a plurality of reference parameters of a reference object in a reference image. Further, the method includes storing, by the electronic device, the physical characteristics of the at least one portion of the recognized object.

20 Claims, 23 Drawing Sheets

(51) Int. Cl.
  *G06T 7/70* (2017.01)
  *G06T 7/90* (2017.01)
  *G06F 3/0488* (2013.01)
  *G06T 5/00* (2006.01)
  *G06F 3/01* (2006.01)

(56) References Cited

U.S. PATENT DOCUMENTS

| | | |
|---|---|---|
| 2016/0128672 A1 | 5/2016 | Kim et al. |
| 2016/0139671 A1 | 5/2016 | Jun et al. |
| 2017/0148226 A1 | 5/2017 | Zhang et al. |
| 2017/0255268 A1 | 9/2017 | Cruz-Hernandez et al. |
| 2017/0293361 A1 | 10/2017 | Lee et al. |
| 2018/0132003 A1 | 5/2018 | Lee et al. |
| 2018/0330166 A1* | 11/2018 | Redden ................ G06T 7/0002 |
| 2019/0188495 A1* | 6/2019 | Zhao ........................ G06K 9/66 |

* cited by examiner

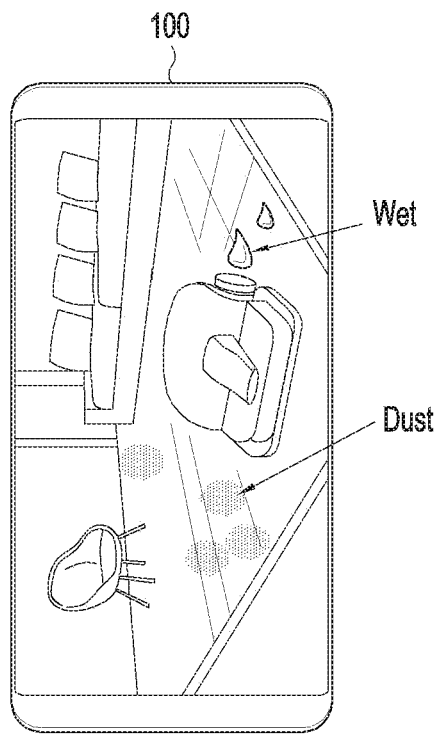
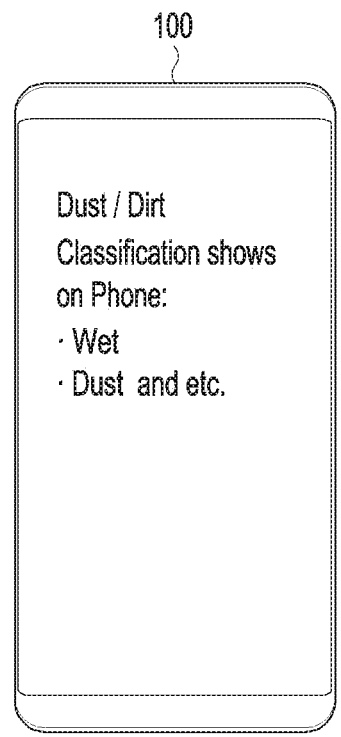
FIG.17A  FIG.17B
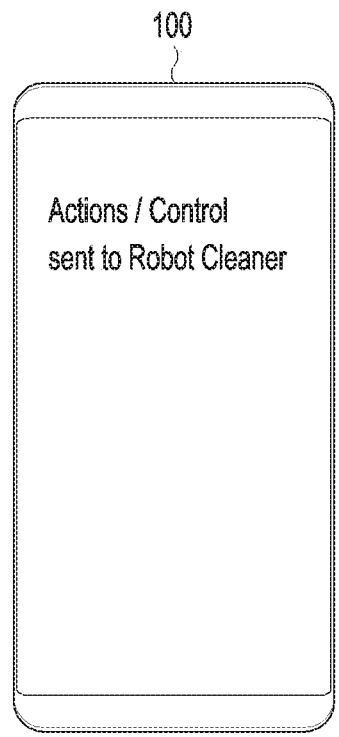
FIG.17C  FIG.17D

METHOD AND SYSTEM FOR DETERMINING PHYSICAL CHARACTERISTICS OF OBJECTS

CROSS-REFERENCE TO RELATED APPLICATION(S)

This application is based on and claims priority under 35 U.S.C. § 119(a) of an Indian Complete patent application number 201841043788, filed on Nov. 21, 2018, in the Indian Patent Office, the disclosure of which is incorporated by reference herein in its entirety.

BACKGROUND

1. Field

The present disclosure relates to an artificial intelligence (AI) system, and is more specifically related to a method and system for determining physical characteristics of objects.

2. Description of Related Art

While viewing any object in an image, it is difficult to provide physical characteristics of the object to a remote user or a local user unless the remote user or the local user touches a real-world object physically. There is no rich advanced feature through which the user can obtain the physical characteristics of a selected object along with various advanced features for the object in the related context. This leads to the user inconvenience.

FIG. 1 is an example scenario in which an electronic device determines physical characteristics of objects, according to the related art.

Referring to FIG. 1, the user of an electronic device captures an image 100 in a location within a house. Based on the image 100, the user is not aware about the status of the dust/cleaning/wet/dry of his/her sofa from a remote location. As well as he/she is not aware about the level/intensity of the dust/cleaning/wet/dry level of the sofa.

FIG. 2 is an example scenario in which an electronic device determines physical characteristics of objects, according to the related art.

Referring to FIG. 2, the user paints on a wall and captures an image 100. After painting, the user is not able to obtain the level of smoothness, dry or wet, roughness status of the wall unless he/she touches the wall. That is, the user is not able to obtain the level of smoothness, dry or wet, roughness status of the wall from the image 100.

Thus, it is desired to address the above-mentioned disadvantages or other shortcomings or at least provide a useful alternative.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and system for determining physical characteristics of objects.

Another aspect of the disclosure is to recognize an object in a candidate image.

Another aspect of the disclosure is to preprocess the candidate image for at least one of removal of noise from the candidate image or correct processing parameters of the recognized object in the candidate image using at least one of an artificial intelligence model or a machine learning model.

Another aspect of the disclosure is to extract a plurality of candidate parameters of the recognized object in the candidate image.

Another aspect of the disclosure is to perform an analysis of the plurality of candidate parameters of the recognized object in the candidate image with the plurality of reference parameters of a reference object in a reference image using at least one of the artificial intelligence model or the machine learning model.

Another aspect of the disclosure is to identify differences between the plurality of candidate parameters and the plurality of reference parameters based on the analysis.

Another aspect of the disclosure is to determine the physical characteristics of at least one portion of the recognized object in the candidate image by comparing the plurality of candidate parameters with the plurality of reference parameters of the reference object in the reference image.

Another aspect of the disclosure is to store the physical characteristics of the at least one portion of the recognized object.

Another aspect of the disclosure is to preprocess the physical characteristics of the at least one portion of the recognized object using at least one of a box generator or a shape generator of a cascaded artificial intelligence model.

Another aspect of the disclosure is to determine geometric parameters of the physical characteristics of the at least one portion of the recognized object.

Another aspect of the disclosure is to input conditional labels into a generator and a discriminator using an advanced generative adversarial network (GAN) model.

Another aspect of the disclosure is to determine a level of intensity of the geometric parameters of the physical characteristics of the at least one portion of the recognized object based on the GAN model.

Another aspect of the disclosure is to generate realistic samples of the physical characteristics of the at least one portion based on the conditional labels.

Another aspect of the disclosure is to generate at least one of a visual indication, feedback information, or a control instruction for the physical characteristics of the at least one portion based on realistic samples and the geometric parameters.

Another aspect of the disclosure is to store the at least one of the visual indication, the feedback information, or the control instruction for the physical characteristics of the at least one portion of the recognized object in the candidate image.

Another aspect of the disclosure is to display the at least one of the visual indication, the feedback information, or the control instruction for the physical characteristics of the at least one portion of the recognized object in the candidate image.

Another aspect of the disclosure is to send the at least one of the visual indication, the feedback information, or the control instruction to another electronic device for automatically performing a control operation.

Another aspect of the disclosure is to detect a gesture performed on the at least one portion of the recognized object in the candidate image.

Another aspect of the disclosure is to automatically provide a recommendation to the user at the at least one portion of the recognized object in the candidate image.

Additional aspects will be set forth in part in the description which follows and, in part, will be apparent from the description, or may be learned by practice of the presented embodiments.

In accordance with an aspect of the disclosure, a method for determining physical characteristics of objects is provided. The method includes recognizing, by an electronic device, an object in a candidate image. Further, the method includes extracting, by the electronic device, a plurality of candidate parameters of the recognized object in the candidate image. Further, the method includes determining, by the electronic device, physical characteristics of at least one portion of the recognized object in the candidate image by comparing the plurality of candidate parameters with a plurality of reference parameters of a reference object in a reference image. Further, the method includes storing, by the electronic device, the physical characteristics of the at least one portion of the recognized object.

In an embodiment, further, the method includes determining, by the electronic device, geometric parameters of the physical characteristics of the at least one portion of the recognized object. Further, the method includes generating, by the electronic device, at least one of a visual indication, feedback information, or a control instruction for the physical characteristics of the at least one portion of the recognized object based on the geometric parameters. Further, the method includes storing, by the electronic device, the at least one of the visual indication, the feedback information, or the control instruction for the physical characteristics of the at least one portion of the recognized object in the candidate image. Further, the method includes displaying, by the electronic device, the at least one of the visual indication, the feedback information, or the control instruction for the physical characteristics of the at least one portion of the recognized object in the candidate image.

In an embodiment, further, the method includes sending the at least one of the visual indication, the feedback information, or the control instruction to another electronic device for automatically performing a control operation.

In an embodiment, further, the method includes detecting a gesture performed on the at least one portion of the recognized object in the candidate image. Further, the method includes automatically providing a recommendation to the user at the at least one portion of the recognized object in the candidate image.

In an embodiment, the recommendation includes at least one of indication of an intensity level about the comparison, a color variation about the comparison, or a shape change about the comparison.

In an embodiment, the candidate object is selected by a user in the candidate image.

In an embodiment, the candidate parameter includes at least one of metadata information about the recognized object in the candidate image, pixel information of each portion of the recognized object in the candidate image, a location of each portion of the recognized object in the candidate image, or a color, an intensity, a shape, or a size of each pixel of each portion of the recognized object in the candidate image.

In an embodiment, the reference parameters includes at least one of metadata information about the reference object in the reference image, pixel information of each portion of the reference object in the reference image, a location of each portion of the reference object in the reference image, or a color, an intensity, a shape, or a size of each pixel of each portion of the reference object in the reference image.

In an embodiment, the reference object represents a same or a similar characteristic of the object of the candidate image.

In an embodiment, the physical characteristic represents an intrinsic property of the recognized object.

In an embodiment, extracting the plurality of candidate parameters of the recognized object in the candidate image includes preprocessing the candidate image for at least one of removal of noise from the candidate image or correcting processing parameters of the recognized object in the candidate image using at least one of an artificial intelligence model or a machine learning model, and extracting the plurality of candidate parameters of the recognized object in the preprocessed candidate image using at least one of the artificial intelligence model or the machine learning model.

In an embodiment, determining the physical characteristics of at least one portion of the recognized object in the candidate image by comparing the plurality of candidate parameters with the plurality of reference parameters of reference object in the reference image includes performing an analysis of the plurality of candidate parameters of the recognized object in the candidate image with the plurality of reference parameters of reference object in the reference image using at least one of the artificial intelligence model or the machine learning model and identifying differences between the plurality of candidate parameters and the plurality of reference parameters based on the analysis.

In an embodiment, the geometric parameter includes a location, a size, a shape, or an intensity of the physical characteristics of the at least one portion of the recognized object in the candidate image.

In an embodiment, determining the geometric parameters of the physical characteristics of the at least one portion of the recognized object includes preprocessing the physical characteristics of the at least one portion of the recognized object using at least one of a box generator or a shape generator of cascaded artificial intelligence model, and determining the geometric parameters of the preprocessed characteristics using the cascaded artificial intelligence model.

In an embodiment, generating at least one of the visual indication, the feedback information, or the control instruction for the physical characteristics of the at least one portion of the recognized object based on the geometric parameters includes inputting conditional labels into a generator and a discriminator using an advanced generative adversarial network (GAN) model, determining a level of intensity of the geometric parameters of the physical characteristics of the at least one portion of the recognized object based on the GAN model, generating realistic samples of the physical characteristics of the at least one portion based on the conditional labels, and generating at least one of the visual indication, the feedback information, or the control instruction for the physical characteristics of the at least one portion based on the realistic samples.

In accordance with another aspect of the disclosure, an electronic device for determining physical characteristics of objects is provided. The electronic device includes a physical characteristics management engine coupled to a memory and at least one processor. The physical characteristics management engine is configured to recognize an object in a candidate image and extract a plurality of candidate parameters of the recognized object in the candidate image. The physical characteristics management engine is configured to determine physical characteristics of at least one portion of the recognized object in the candidate image by comparing the plurality of candidate parameters with a plurality of reference parameters of a reference object in a reference image. The physical characteristics management engine is configured to store the physical characteristics of the at least one portion of the recognized object.

In accordance with another aspect of the disclosure, a system for determining physical characteristics of objects is provided. The system includes a first electronic device coupled to a second electronic device. The first electronic device is configured to recognize an object in a candidate image and extract a plurality of candidate parameters of the recognized object in the candidate image. Further, the first electronic device is configured to determine physical characteristics of at least one portion of the recognized object in the candidate image by comparing the plurality of candidate parameters with a plurality of reference parameters of a reference object in a reference image. Further, the first electronic device is configured to determine geometric parameters of the physical characteristics of the at least one portion of the recognized object. Further, the first electronic device is configured to generate at least one of a visual indication, feedback information, or a control instruction for the physical characteristics of the at least one portion of the recognized object based on the geometric parameters. Further, the first electronic device is configured to send the at least one of the visual indication, the feedback information, or the control instruction to the second electronic device. The second electronic device is configured to receive the at least one of the visual indication, the feedback information, or the control instruction from the first electronic device and automatically perform a control operation.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 17A, 17B, 17C, 17D, 17E, 17F, 18A, 18B, 18C, 18D, 18E, 18F, and 18G are example scenarios in which an electronic device performs a cleaning operation on a floor, according to various embodiments of the disclosure;

Throughout the drawings, it should be noted that like reference numbers are used to depict the same or similar elements, features, and structures.

DETAILED DESCRIPTION

Figure 1:
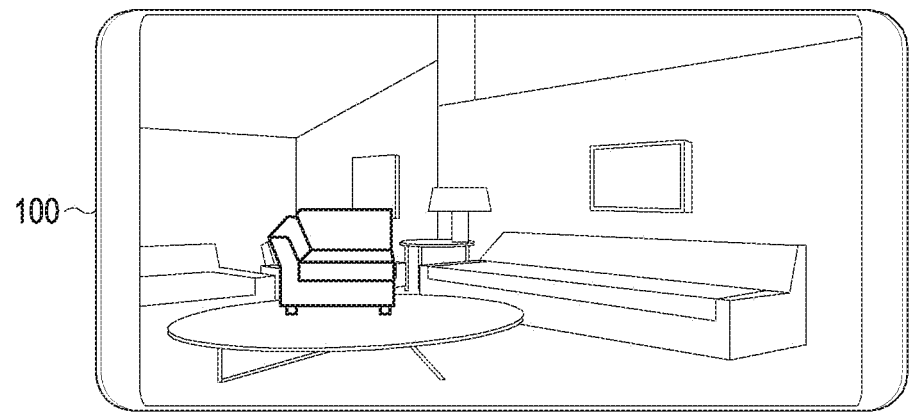
FIGS. 1 and 2 are example scenarios in which an electronic device determines physical characteristics of objects, according to the related art.
Figure 2:
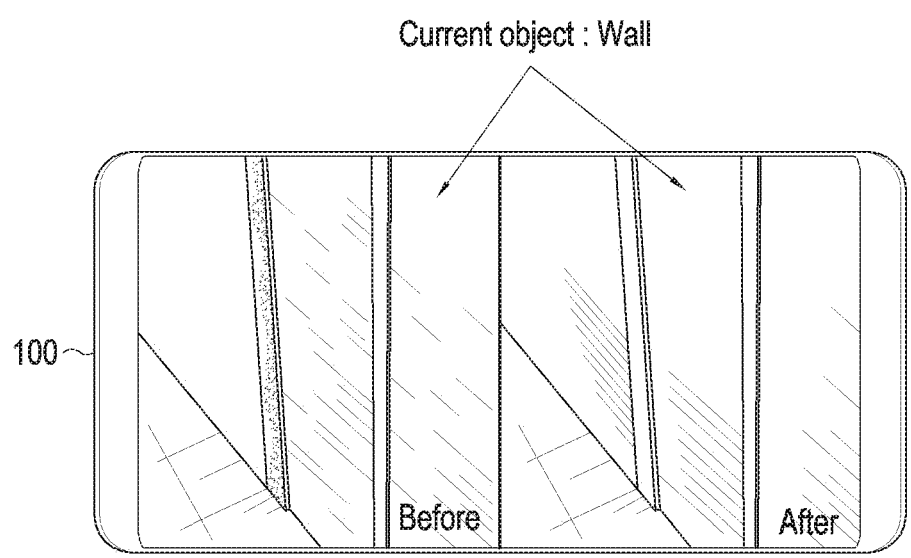

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hardwired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein achieve a method for determining physical characteristics of objects. The method includes recognizing, by an electronic device, an object in a candidate image. Further, the method includes extracting, by the electronic device, a plurality of candidate parameters of the recognized object in the candidate image. Further, the method includes determining, by the electronic device, physical characteristics of at least one portion of the recognized object in the candidate image by comparing the plurality of candidate parameters with a plurality of reference parameters of a reference object in a reference image. Further, the method includes storing, by the electronic device, the physical characteristics of the at least one portion of the recognized object.

Unlike methods and system of the related art, the proposed method can be used to provide the artificial Intelligence (AI) based physical characteristics generation of the object in the candidate image in an effective, accurate enhanced manner. The method can be used to provide the rich information to the user based on the object real/current condition using the cascaded AI and an advanced generative adversarial network (GAN) model. This will provide suggestions to the user for further actions and hence improving the user experience.

Referring now to the drawings, and more particularly to FIGS. 3 through 23, there are shown various embodiments.

Figure 3:
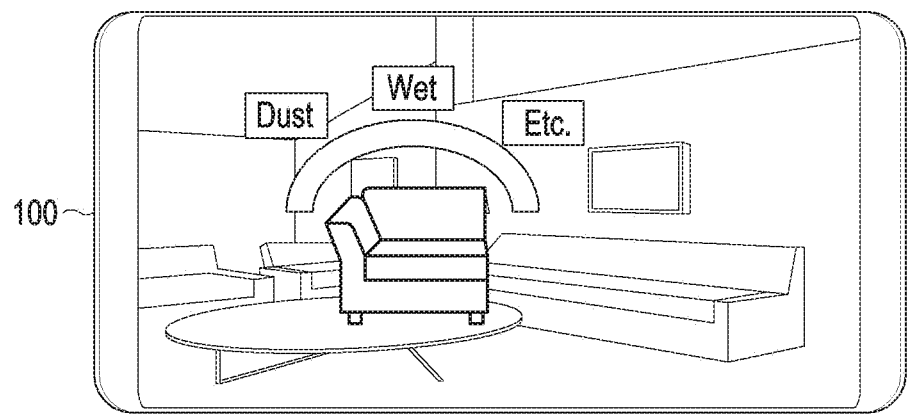
FIG. 3 is an example scenario in which an electronic device determines a physical characteristic of an object, according to an embodiment of the disclosure.

FIG. 3 is an example scenario in which an electronic device determines a physical characteristic of an object, according to an embodiment of the disclosure.

Referring to FIG. 3, the physical characteristic represents an intrinsic property of a recognized object in a candidate image. An electronic device 100 can be, for example, but is not limited to a smart phone, a Personal Digital Assistant (PDA), a tablet computer, a laptop computer, a virtual reality (VR) device, an augmented reality (AR) device or the like. In an embodiment, the electronic device 100 is configured to recognize an object in the candidate image and extract a plurality of candidate parameters of the recognized object in the candidate image. The candidate object is selected by a user in the candidate image.

The candidate parameter can be, for example, but is not limited to metadata information about the recognized object in the candidate image, pixel information of each portion of the recognized object in the candidate image, a location of each portion of the recognized object in the candidate image, or a color, intensity, shape, or size of each pixel of each portion of the recognized object in the candidate image.

In an embodiment, the electronic device 100 is configured to preprocess the candidate image for at least one of removal of noise from the candidate image or correct processing parameters of the recognized object in the candidate image using at least one of an artificial intelligence model or a machine learning model. In an example, the electronic device acquires the candidate image from an image capturing device (e.g., camera). The electronic device 100 determines if there are objects inside the candidate image. Further, the electronic device 100 indicates the positions of object features. It passes their coordinates to an object feature extractor to extract low-resolution object features as input of an object recognizer for preprocessing the candidate image.

Further, the electronic device 100 is configured to extract the plurality of candidate parameters of the recognized object in the preprocessed candidate image using at least one of the artificial intelligence model or the machine learning model.

Further, the electronic device 100 is configured to determine the physical characteristics of at least one portion of the recognized object in the candidate image by comparing the plurality of candidate parameters with a plurality of reference parameters of a reference object in a reference image. The reference object represents the same or similar characteristic of the object of the candidate image. The reference image is gathered or captured from the various resources (e.g., internet, online store, or the like) and can be handled by a repository.

In an example, a probabilistic decision-based neural network (PDBNN) is used for angle based images/objects recognition which represents solely the identity information free from pose variations. In another example, a pyramid-based restoration procedure is applied to produce a shadow-free image, while avoiding loss of texture contrast and introduction of noise. In another example, a multilayer perceptron (MLP) neural network is used to identify the object in the surface water.

The reference parameters can be, for example, but are not limited to metadata information about the reference object in the reference image, pixel information of each portion of the reference object in the reference image, a location of each portion of the reference object in the reference image, or a color, intensity, shape, or size of each pixel of each portion of the reference object in the reference image.

In an embodiment, the electronic device 100 is configured to perform an analysis of the plurality of candidate parameters of the recognized object in the candidate image with the plurality of reference parameters of the reference object in the reference image using at least one of the artificial intelligence model or the machine learning model. Further, the electronic device 100 is configured to identify differences between the plurality of candidate parameters and the plurality of reference parameters based on the analysis. Further, the electronic device 100 is configured to determine the physical characteristics based on the differences. Further, the electronic device 100 is configured to store the physical characteristics of the at least one portion of the recognized object.

In an embodiment, the electronic device 100 is configured to determine geometric parameters of the physical characteristics of the at least one portion of the recognized object. The geometric parameter can be, for example, but is not limited to a location, a size, a shape, or an intensity of the physical characteristics of the at least one portion of the recognized object in the candidate image.

In an embodiment, the electronic device 100 is configured to preprocess the physical characteristics of the at least one portion of the recognized object using at least one of a box generator or a shape generator of a cascaded artificial intelligence model. Further, the electronic device 100 is configured to determine the geometric parameters of the preprocessed characteristics using the cascaded artificial intelligence model.

Further, the electronic device 100 is configured to generate at least one of a visual indication, feedback information, or a control instruction for the physical characteristics of the at least one portion of the recognized object based on the geometric parameters.

Further, the electronic device 100 is configured to input conditional labels into a generator and a discriminator using a GAN model. Further, the electronic device 100 is configured to determine a level of intensity of the geometric parameters of the physical characteristics of the at least one portion of the recognized object based on the GAN model. Further, the electronic device 100 is configured to generate realistic samples of the physical characteristics of the at least one portion based on the conditional labels. Further, the electronic device 100 is configured to generate at least one of the visual indication, the feedback information, or the control instruction for the physical characteristics of the at least one portion based on the realistic samples.

Further, the electronic device 100 is configured to store the at least one of the visual indication, the feedback information, or the control instruction for the physical characteristics of the at least one portion of the recognized object in the candidate image. Further, the electronic device 100 is configured to display the at least one of the visual indication, the feedback information, or the control instruction for the physical characteristics of the at least one portion of the recognized object in the candidate image.

Further, the electronic device 100 is configured to send the at least one of the visual indication, the feedback information, or the control instruction to another electronic device 200 for automatically performing a control operation. In an embodiment, the electronic device 100 is configured to send the at least one of the control instruction to another electronic device 200 in the form of a voice command.

In another example, the electronic device 100 is configured to detect a gesture performed on the at least one portion of the recognized object in the candidate image and automatically provide a recommendation to the user at the at least one portion of the recognized object in the candidate image. The recommendation comprises at least one of an indication of an intensity level about the comparison, a color variation about the comparison, or a shape change about the comparison. Various examples of the recommendation are explained in FIG. 22 and FIG. 23. Various examples of the electronic device 100 determining the physical characteristics of objects are explained in FIGS. 13, 14A, 14B, 15, 16, 17A to 17F, 18A to 18G, 19, 20A to 20D, 21A, and 21B.

Figure 4:
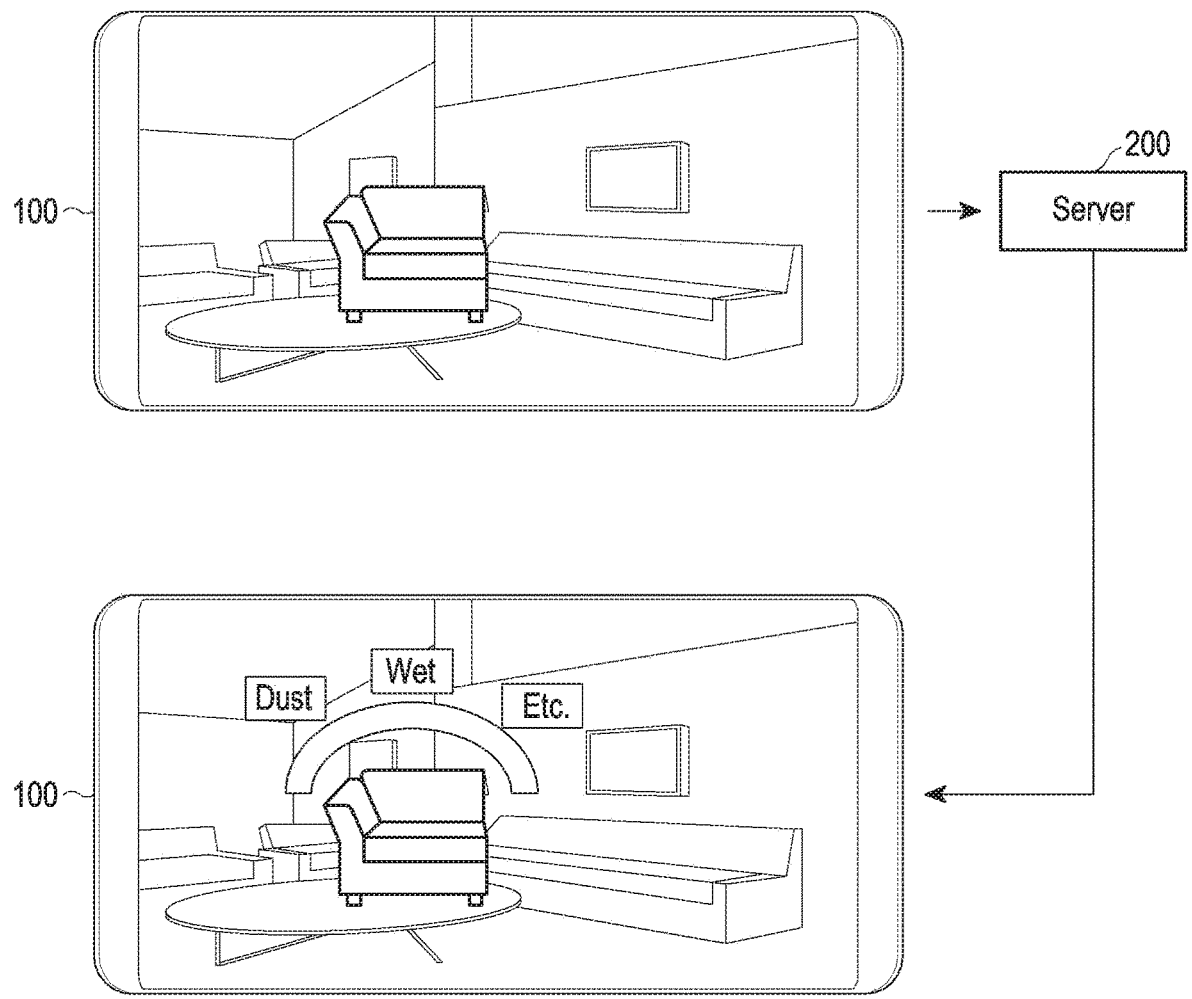
FIGS. 4 and 5 are schematic views of a system for determining physical characteristics of objects, according to various embodiments of the disclosure.

FIG. 4 is a schematic view of a system for determining a physical characteristic of an object, according to an embodiment of the disclosure.

Referring to FIG. 4, in an embodiment, the system includes the electronic device 100 and a server 200. In an embodiment, the electronic device 100 is configured to capture the candidate image and recognize the object in the candidate image. Further, the electronic device 100 sends the recognized object to the server 200. The server 200 receives the recognized object from the electronic device 100.

Based on the recognized object, the server 200 extracts the plurality of candidate parameters of the recognized object in the candidate image.

In an embodiment, the server 200 is configured to preprocess the candidate image for the at least one of removal of noise from the candidate image or correct processing parameters of the recognized object in the candidate image using at least one of the artificial intelligence model or the machine learning model. Further, the server 200 is configured to extract the plurality of candidate parameters of the recognized object in the preprocessed candidate image using at least one of the artificial intelligence model or the machine learning model.

Further, the server 200 is configured to determine physical characteristics of at least one portion of the recognized object in the candidate image by comparing the plurality of candidate parameters with the plurality of reference parameters of the reference object in the reference image.

In an embodiment, the server 200 is configured to perform the analysis of the plurality of candidate parameters of the recognized object in the candidate image with the plurality of reference parameters of the reference object in the reference image using at least one of the artificial intelligence model or the machine learning model. Further, the server 200 is configured to identify differences between the plurality of candidate parameters and the plurality of reference parameters based on the analysis. Further, the server 200 is configured to determine the physical characteristics based on the differences. Further, the server 200 sends the physical characteristics of the at least one portion of the recognized object to the electronic device 100.

In an embodiment, the server 200 is configured to determine geometric parameters of the physical characteristics of the at least one portion of the recognized object. In an embodiment, the server 200 is configured to preprocess the physical characteristics of the at least one portion of the recognized object using at least one of a box generator or a shape generator of a cascaded artificial intelligence model. Further, the server 200 is configured to determine the geometric parameters of the preprocessed characteristics using the cascaded artificial intelligence model.

Further, the server 200 is configured to generate at least one of the visual indication, the feedback information, or the control instruction for the physical characteristics of the at least one portion of the recognized object based on the geometric parameters. Further, the server 200 is configured to send at least one of the visual indication, the feedback information, or the control instruction for the physical characteristics of the at least one portion of the recognized object to the electronic device 100.

Further, the electronic device 100 is configured to receive the at least one of the visual indication, the feedback information, or the control instruction for the physical characteristics of the at least one portion of the recognized object in the candidate image. Further, the electronic device 100 is configured to store the at least one of the visual indication, the feedback information, or the control instruction for the physical characteristics of the at least one portion of the recognized object in the candidate image. Further, the electronic device 100 is configured to display the at least one of the visual indication, the feedback information, or the control instruction for the physical characteristics of the at least one portion of the recognized object in the candidate image.

Further, the electronic device 100 is configured to send the at least one of the visual indication, the feedback information, or the control instruction to another electronic device 200 for automatically performing a control operation.

In another embodiment, the electronic device 100 is configured to detect a gesture performed on the at least one portion of the recognized object in the candidate image and automatically provide a recommendation to the user at the at least one portion of the recognized object in the candidate image.

Figure 5:
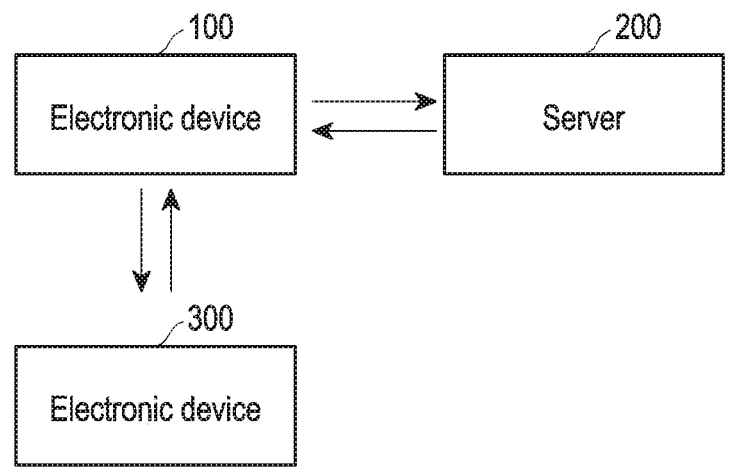

FIG. 5 is a schematic view of a system for determining a physical characteristic of an object, according to an embodiment of the disclosure.

Referring to FIG. 5, in an embodiment, a system includes a first electronic device 100, a server 200 and a second electronic device 300. The second electronic device 300 can be, for example, but is not limited to a robot, smart washing machine, a smart dishwasher or the like.

The operations and functions of the electronic device 100 and the server 200 are explained in conjunction with FIGS. 3 and 4. The electronic device 100 is configured to send the at least one of the visual indication, the feedback information, or the control instruction to another electronic device 200 for automatically performing the control operation. The other electronic device 200 is configured to receive the at least one of the visual indication, the feedback information, or the control instruction form the electronic device 100. The other electronic device 200 is configured to automatically perform the control operation and send the status about the control operation to the electronic device 100.

Figure 6:
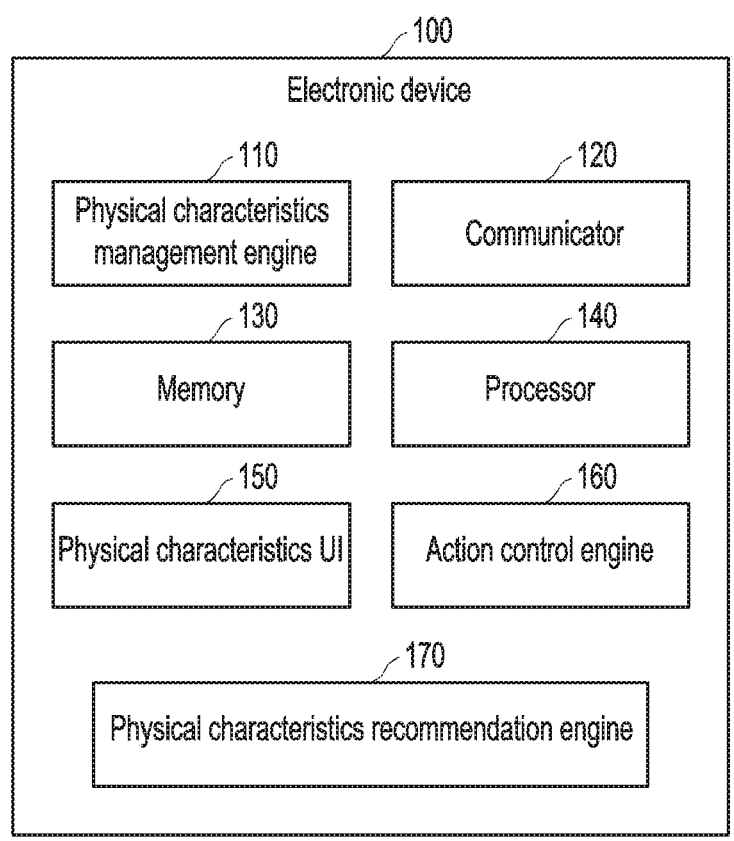
FIG. 6 is a block diagram of an electronic device, according to an embodiment of the disclosure.

FIG. 6 is a block diagram of an electronic device, according to an embodiment of the disclosure.

Referring to FIG. 6, in an embodiment, the electronic device 100 includes a physical characteristics management engine 110, a communicator 120, a memory 130, a processor 140, a physical characteristics user interface (UI) 150, an action control engine 160 and a physical characteristics recommendation engine 170. The processor 140 communicates with the physical characteristics management engine 110, the communicator 120, the memory 130, the physical characteristics UI 150, the action control engine 160 and the physical characteristics recommendation engine 170.

In an embodiment, the physical characteristics management engine 110 is configured to recognize the object in the candidate image and extract the plurality of candidate parameters of the recognized object in the candidate image.

In an embodiment, the physical characteristics management engine 110 is configured to preprocess the candidate image for the at least one of removal of noise from the candidate image or correct the processing parameters of the recognized object in the candidate image using at least one of the artificial intelligence model or the machine learning model. Further, the physical characteristics management engine 110 is configured to extract the plurality of candidate parameters of the recognized object in the preprocessed candidate image using at least one of the artificial intelligence model or the machine learning model.

The physical characteristics management engine 110 is configured to determine physical characteristics of at least one portion of the recognized object in the candidate image by comparing the plurality of candidate parameters with the plurality of reference parameters of the reference object in the reference image.

In an embodiment, the physical characteristics management engine 110 is configured to perform the analysis of the plurality of candidate parameters of the recognized object in the candidate image with the plurality of reference parameters of the reference object in the reference image using at least one of the artificial intelligence model or the machine learning model. Further, the physical characteristics management engine 110 is configured to identify differences between the plurality of candidate parameters and the plurality of reference parameters based on the analysis. Further, the physical characteristics management engine 110 is configured to determine the physical characteristics based on the differences.

The physical characteristics management engine 110 is configured to store the physical characteristics of the at least one portion of the recognized object.

In an embodiment, the physical characteristics management engine 110 is configured to determine the geometric parameters of the physical characteristics of the at least one portion of the recognized object.

In an embodiment, the physical characteristics management engine 110 is configured to preprocess the physical characteristics of the at least one portion of the recognized object using at least one of the box generator and the shape generator of cascaded artificial intelligence model. The physical characteristics management engine 110 is configured to determine the geometric parameters of the preprocessed characteristics using the cascaded artificial intelligence model.

Based on the geometric parameters, the physical characteristics recommendation engine 170 is configured to generate at least one of the visual indication, the feedback information, or the control instruction for the physical characteristics of the at least one portion of the recognized object.

The physical characteristics management engine 110 is configured to input conditional labels into the generator and the discriminator using the GAN model. Further, the physical characteristics management engine 110 is configured to determine the level of intensity of the geometric parameters of the physical characteristics of the at least one portion of the recognized object based on the GAN model. The physical characteristics management engine 110 is configured to generate realistic samples of the physical characteristics of the at least one portion based on the conditional labels. The physical characteristics management engine 110 is configured to generate at least one of the visual indication, the feedback information, or the control instruction for the physical characteristics of the at least one portion based on the realistic samples using the physical characteristics recommendation engine 170.

The physical characteristics management engine 110 is configured to store the at least one of the visual indication, the feedback information, or the control instruction for the physical characteristics of the at least one portion of the recognized object in the candidate image in the memory 130. The physical characteristics UI 150 is configured to display the at least one of the visual indication, the feedback information, or the control instruction for the physical characteristics of the at least one portion of the recognized object in the candidate image.

Further, the action control engine 160 is configured to send the at least one of the visual indication, the feedback information, or the control instruction to another electronic device 300 for automatically performing the control operation.

Further, the physical characteristics UI 150 is configured to detect the gesture performed on the at least one portion of the recognized object in the candidate image and automatically provide the recommendation to the user at the at least one portion of the recognized object in the candidate image.

The processor 140 is configured to execute instructions stored in the memory 130 and to perform various processes. The communicator 120 is configured for communicating internally between internal hardware components and with external devices via one or more networks.

The memory 130 stores instructions to be executed by the processor 140. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In some examples, the memory 130 can be configured to store larger amounts of information than the memory. In certain examples, a non-transitory storage medium may store data that can, over time, change (e.g., in Random Access Memory (RAM) or cache).

Although FIG. 6 shows various hardware components of the electronic device 100, it is to be understood that other embodiments are not limited thereon. In other embodiments, the electronic device 100 may include more or fewer components. Further, the labels or names of the components are used only for illustrative purpose and does not limit the scope of the disclosure. One or more components can be combined together to perform the same or substantially similar function to determine the physical characteristics of objects.

Figure 7:
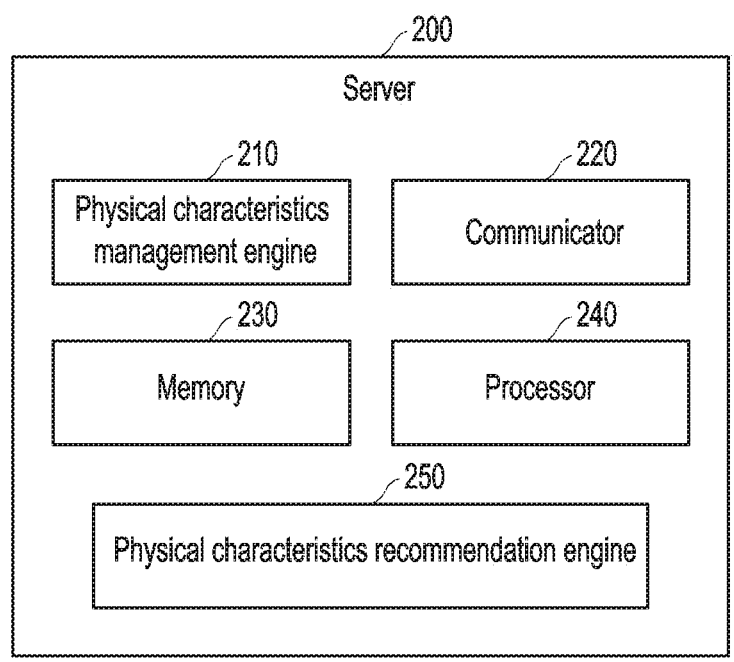
FIG. 7 is a block diagram of a server, according to an embodiment of the disclosure.

FIG. 7 is a block diagram of a server, according to an embodiment of the disclosure.

Referring to FIG. 7, in an embodiment, the server 200 includes a physical characteristics management engine 210, a communicator 220, a memory 230, a processor 240, and a physical characteristics recommendation engine 250. The operations and functions of the physical characteristics management engine 210, the communicator 220, the memory 230, the processor 240, and the physical characteristics recommendation engine 250 are similar or substantially similar to the operations and functions of the physical characteristics management engine 110, the communicator 120, the memory 130, the processor 140, and the physical characteristics recommendation engine 170 explained in the FIG. 6. For the sake of brevity, the similar operations are not explained in the disclosure.

Figure 8:
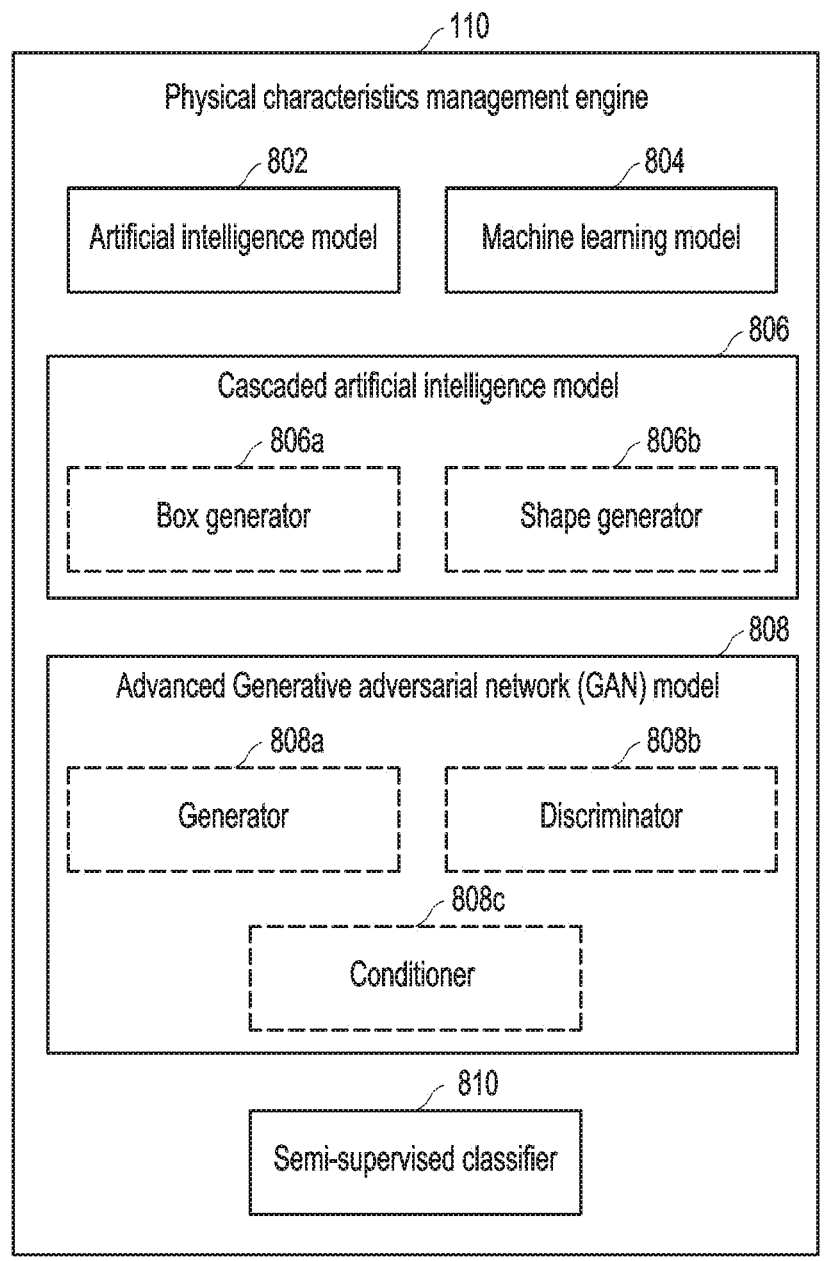
FIG. 8 is a block diagram of a physical characteristics management engine, according to an embodiment of the disclosure.

FIG. 8 is a block diagram of a physical characteristics management engine, according to an embodiment of the disclosure.

Referring to FIG. 8, in an embodiment, the physical characteristics management engine 110 includes an artificial intelligence model 802, a machine learning model 804, a cascaded artificial intelligence model 806, a GAN model 808, and a semi-supervised classifier 810. In an embodiment, the cascaded artificial intelligence model 806 includes the box generator 806a and the shape generator 806b. In an embodiment, the GAN model 808 includes the generator 808a, the discriminator 808b, and the conditioner 808c. The operations and functions of the artificial intelligence model 802, the machine learning model 804, the cascaded artificial intelligence model 806, the GAN model 808, the semi-supervised classifier 810, the box generator 806a, the shape generator 806b, the generator 808a, the discriminator 808b, and the conditioner 808c are explained in connection with FIGS. 3 to 7.

In an embodiment, the generator 808a generates the physical characteristics generation for a learning purpose. The generator 808a and the discriminator 808b learn jointly and produce an output of the physical characteristics generation. The generator 808a implicitly defines a probability distribution as the distribution of the samples, so that to converge to a good estimator of the physical characteristics generation based on enough capacity and training time. A generative network's training objective is to handle an error rate of a discriminative network so that the learning of the discriminator 808b keeps increasing with time. Overall the job of the discriminator 808b is to evaluate the result (e.g., physical characteristics generation or the like) of the generator 808a and the discriminator 808b provides the final result of the physical characteristics generation in an accurate manner. In an embodiment, the generator 808a can be a deconvolutional neural network (DC-NN).

In an embodiment, without using the generator 808a, the discriminator 808b provides the output based on self-learning and training procedure. In that scenario, the discriminator can act as a convolutional neural network (CNN). The generator 808a is used to improve the self-learning of the electronic device 100 to generate more accurate results.

The conditioner 808c produces the physical characteristics that preserve semantic details and highly relevant to the input for an object image feature difference data by conditioning results generation on explicit prediction on the physical characteristics of the at least one portion of the recognized object. The conditioner 808c improves quality of the result of the determining, by the electronic device, geometric parameters of the physical characteristics of the at least one portion of the recognized object.

The box generator 806a outputs a set of bounding boxes, where each bounding boxes defines the location, size, and category label of the physical characteristics. The box generator 806a generates the clear boundary for the physical characteristics. In an example, an icon shape and an icon size are varied in visual based on a density of the physical characteristics. Further, the physical characteristics related icons can be shown in various shape, size, color, and area by using the box generator 806a. The shape generator 806b outputs the predicted shapes and intensity of the physical characteristics.

The box generator 806a obtains the object image difference features as input, and generates a coarse layout by composing object instances in the physical characteristics feedback. The output of the box generator 806a is a set of bounding boxes (consider, B1:T={B1, ..., BT}, where each bounding box Bt defines the location, size, and category label of the t-th object. Each bounding box Bt is associated with a class label to define which class of object to place and where, which plays a critical role in determining the global layout of the scene).

The shape generator 806b takes a set of bounding boxes generated from the box generator 806a, and predicts shapes/intensity of the physical characteristics inside the box generator 806a. The output of the shape generator 806b is a set of binary masks (M1:T={M1, . . . , MT}, where each mask $M_t$ defines the foreground shape/intensity of the $t_{th}$ is object, we first generate a coarse layout of the physical characteristics in the form of object bounding boxes. Given a set of bounding boxes obtained by the box generator 806a, the shape generator 806b predicts more detailed physical characteristics structures.

In an embodiment, an auto-regressive decoder is used for the box generator 806a by decomposing the conditional joint bounding box probability using a LSTM model, gaussian mixture model (GMM) model and a categorical distribution model.

In an embodiment, the generator 808a and the discriminator 808b are deep convolutional neural networks. The text embedding is projected to a 128-dimensional vector by linear transformation. In the generator 808a, the input is formed by concatenating the text embedding vector with a 100-dimensional noise sampled from unit normal distribution. In the discriminator 808b, the projected text-embedding vector is depth concatenated with the final convolutional feature map. This results in improving visual realism in text to image synthesis.

The box generator 806a and the shape generator 806b can operate individually either in series or parallel or as a single entity.

The semi-supervised classifier 810 classifies the pixel values features into classes (e.g., dust, particles, wet, dry, soft, hard, rust, polish or the like) using an unsupervised learning model.

In an embodiment, a framework performs a machine learning procedure to train the semi-supervised classifier 810 using a training image pixel dataset. The trained semi-supervised classifier 810 is applied to image pixel to identify one or more difference pixels, which may then be corrected. A difference pixel identification is performed by the physical characteristics management engine 110. Additional, different, or fewer operations may also be provided. The artificial intelligence model 802 and the machine learning model 804 receives one or more training image datasets from a reference imaging system.

The training image datasets include raw data images and ground truth reference images. More particularly, the raw data may be images corrected for offset and gain only (but not difference pixels), while the ground truth images are the same images corrected for offset, gain and difference pixels. A module may identify 'n' datasets from the training image datasets for training the semi-supervised classifier 810, wherein 'n' is an integer greater than zero and less than the total number 'T' of training datasets available. The variety of images identified for training may cover all or most varieties of applications.

The physical characteristics management engine 110 performs the machine learning technique based on the training image datasets to train the semi-supervised classifier 810 to identify difference pixels. The semi-supervised classifier 810 is trained to identify difference pixels based on target and source image pixels. The semi-supervised classifier 810 may be trained by using a suitable machine learning technique, such as random forests, convolutional neural networks, convolutional networks, or any other technique. It should be appreciated that other types of machine learning techniques may also be used.

In an example, the semi-supervised classifier 810 is trained using random forests (or random decision forests). The random forests operate by constructing a multitude of decision trees at training time and output the class that is the mode of the classes. The module first determines spatial features that can be used to identify difference pixels. Spatial features include pixel values, derivatives in x-direction and/or y-direction, and/or median positions in a square (i.e., N-by-N) neighborhood, wherein 'N' is an integer greater than zero and less than a width and/or height of a training image.

In another embodiment, convolutional neural networks are trained to identify difference pixels. The trained semi-supervised classifier 810 may be tested with 'k' test cases. Each test case includes a pair of ground truth image and raw data image. The trained semi-supervised classifier 810 may return a value that indicates the likelihood that an image pixel is difference. A set of values indicating difference pixels for the raw data image may be obtained. The efficacy of the semi-supervised classifier 810 may be evaluated by comparing the number of difference pixels found by the semi-supervised classifier 810 to the number of difference pixels identified in the corresponding ground truth image.

The physical characteristics management engine 110 applies the trained semi-supervised classifier 810 to a current image to identify difference pixels. The trained semi-supervised classifier 810 may be applied to each pixel of the current image to determine a likelihood value that represents the probability of it being difference. Alternatively, the current image is divided into a set of N-by-N patches. The trained semi-supervised classifier 810 may then be applied to each of the N-by-N patches to determine a likelihood value that represents the probability that a center pixel of the patch is difference. A set of likelihood values may be generated for all the pixels in the current image. A pixel may then be identified as difference in response to its likelihood value exceeding a predetermined threshold value. The physical characteristics management engine 110 takes further actions based on differences as difference pixels identified by the trained semi-supervised classifier 810. Further actions are showing the mappings of the difference pixel values in terms of area or coverage.

In an embodiment, the physical characteristics management engine 110 is configured to extract a feature of at least one object in the input image by using a value of an image pixel values difference between pixels of the input image or by using a Red-Green-Blue (RGB) value of the input image. Further, the physical characteristics management engine 110 is configured to convert the extracted feature of the at least one object into an N dimensional feature. Further, the physical characteristics management engine 110 is configured to perform the support vector machine (SVM) machine learning on the N dimensional feature of the at least one object.

In an embodiment, the physical characteristics management engine 110 is configured to detect the physical characteristics by extracting a feature of at least one object in an input image, converting the extracted feature of the at least one object into an N dimensional feature, where N is a natural number, by using a kernel mapping procedure, and performing SVM machine learning on the N dimensional feature of the at least one object, based on coordinate values of the N dimensional feature.

In an embodiment, the physical characteristics management engine 110 is configured to detect the physical characteristics by obtaining differential image pixels with respect to source and target images, and calculating a weight and a differential direction for each pixel of the differential image pixels. An object feature extracting unit (not shown) normalizes a histogram, which is related to the calculated differential direction, with respect to the weight to generate a normalization image, and thus extracts the feature of the object. The differential value and a differential directional value between pixels of the input image are obtained to generate the differential image, and a feature of each position is extracted according to a designated cell size by using a histogram of oriented gradients (HoG).

In an embodiment, the object feature extracting unit applies an RGB value of the input image to the differential image to generate an RGB image. The object feature extracting unit extracts the feature of the object in the input image by integrating information about the weight, which is calculated by using the HoG, for each pixel in the input image, and the characteristic of color information about the input image, as shown in feature image. The object feature extracting unit converts the feature of the object, which is extracted by the object feature extracting unit, into an N dimensional feature (where N is a natural number) by using a kernel mapping method. The mechanical learning model performs SVM machine learning on the feature of the object which is extracted by the object feature extracting unit, based on coordinate values that have been converted by the converting unit by using the kernel mapping method. The physical characteristics management engine 110 detects the physical characteristics from the input image by using the mechanical learning model.

Figure 9:
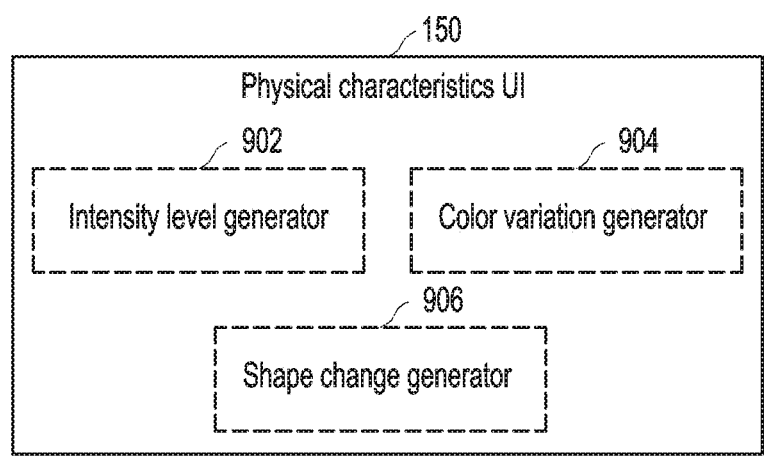
FIG. 9 is a block diagram of a physical characteristics user interface (UI), according to an embodiment of the disclosure.

FIG. 9 is a block diagram of a physical characteristics UI, according to an embodiment of the disclosure.

Referring to FIG. 9, the physical characteristics UI 150 includes an intensity level generator 902, a color variation generator 904, and a shape change generator 906.

In the intensity level generator 902, the perceived intensity of electrovibration can be altered by modulating an amplitude, a frequency, and a waveform of the input voltage signal applied to a conductive layer of the screen of the electronic device 100, so that the sensation difference between the waveforms at various frequencies can be experienced by the user.

In an embodiment, a tactile-rendering procedure is used for simulating the physical characteristics geometric features, such as dry, wet, soft etc., on the screen of the electronic device 100. This is achieved by modulating friction forces between the user's finger and the touch screen. By using the intensity level generator 902, the percept of the physical characteristics is created when local gradients of a rendered virtual surface are mapped to lateral friction forces, so that a tactile rendering procedure allows the user to experience rich tactile textures on the screen.

In an embodiment, an AR tactile procedure allows for change to a tactile feeling of the objects by augmenting them with virtual tactile textures. When sliding his or her fingers on a surface of the object, the user perceives highly distinctive tactile textures augmenting the physical object. By tracking the objects and location of the touch, the user of the electronic device 100 is associated with dynamic tactile sensations to the interaction context. The AR tactile technology will allow to have the physical characteristics along with the rich information to the user.

The color variation generator 904 provides the recommendation in the form of various colors and shape change generator 906 provides the recommendation in the form of various shapes. This will result in increasing the user experience.

The shape change generator 906 progressively constructs a semantic layout in a coarse-to-fine manner by generating object bounding boxes and refines each box by estimating object shapes inside the box. The shape change generator 906 synthesizes an image conditioned on the inferred semantic layout, which provides a useful semantic structure of an image matching with the text description. The shape change generator 906 generates semantically more meaningful images and also allows automatic annotation of generated images and user-controlled generation process by modifying the generated scene layout.

Figure 10:
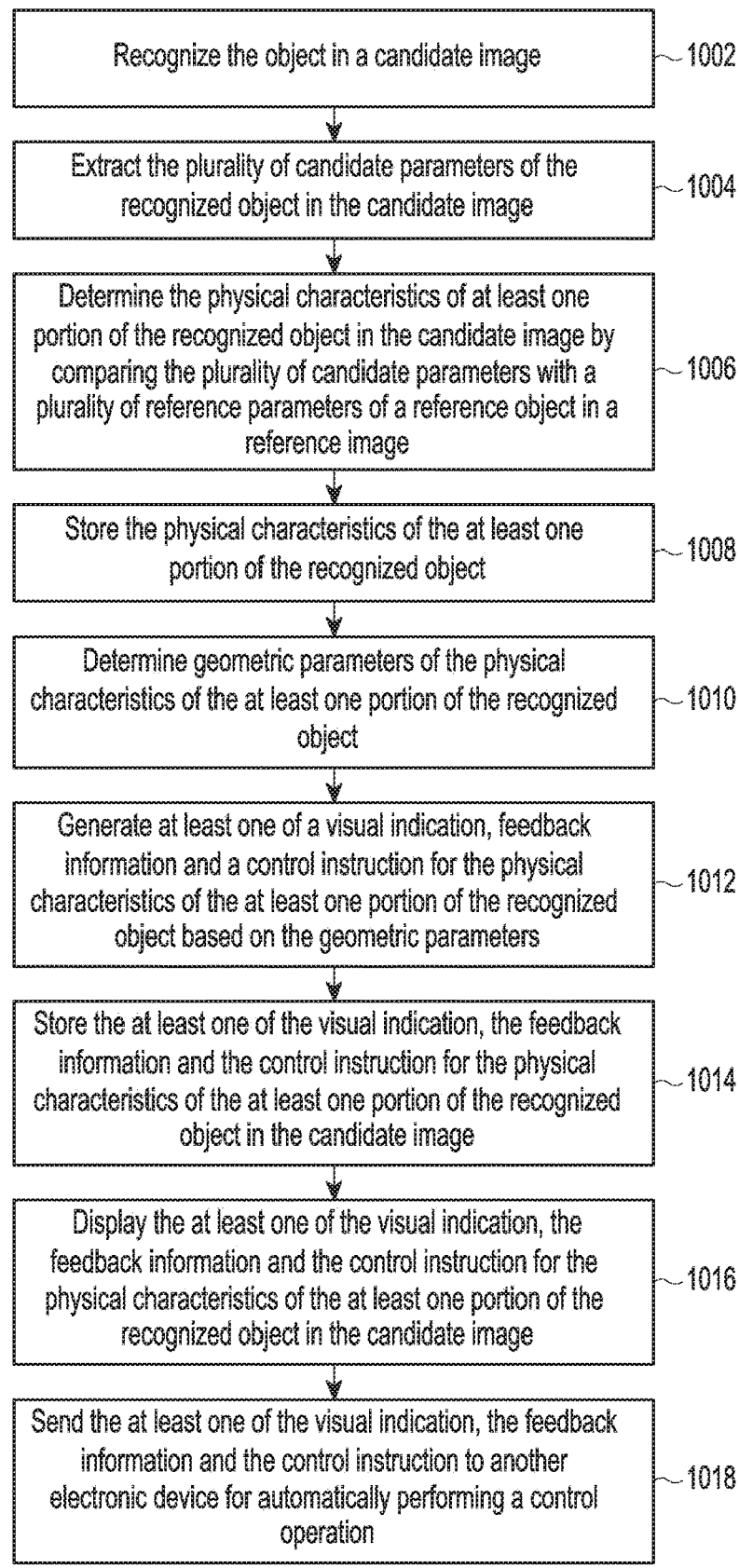
FIGS. 10, 11A, and 11B are flowcharts illustrating a method for determining physical characteristics of objects, according to various embodiments of the disclosure.
Figure 11A:
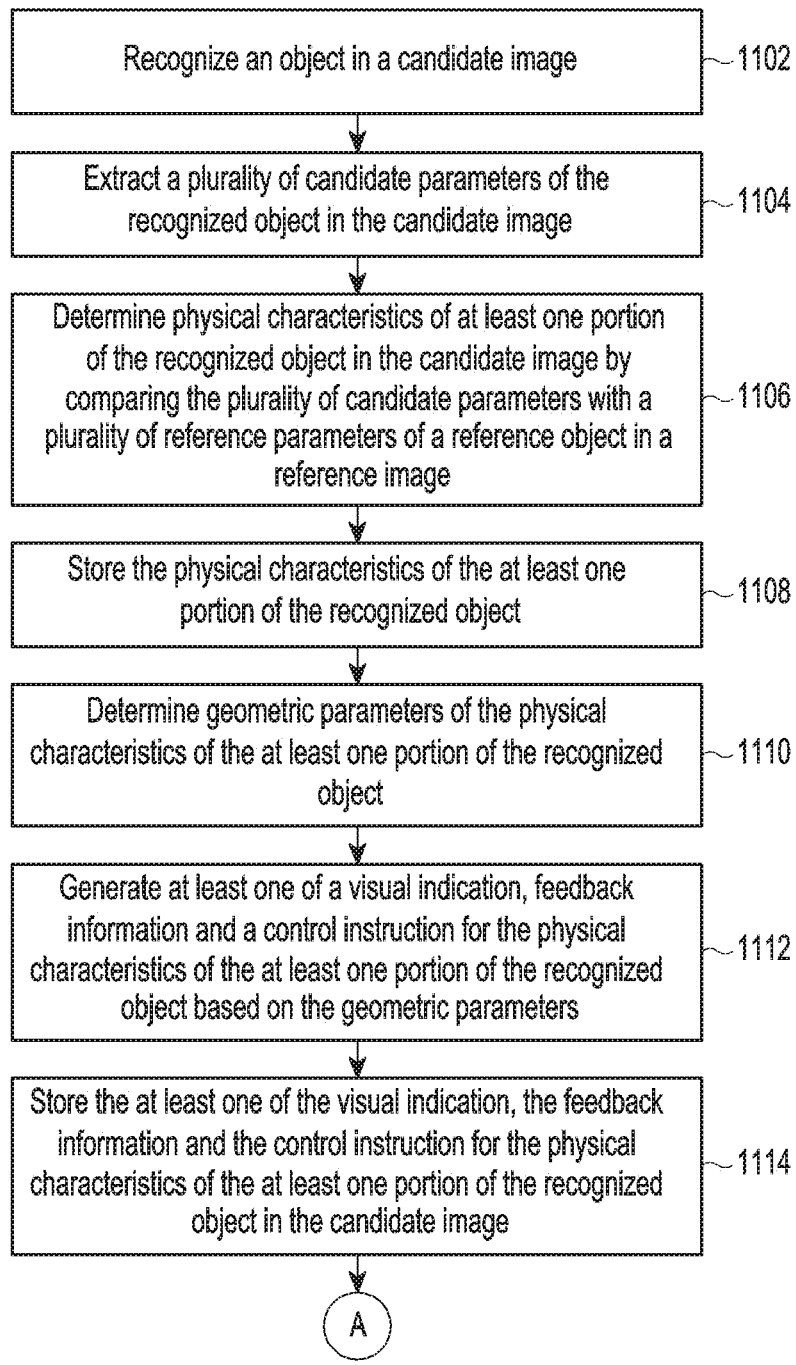
Figure 11B:
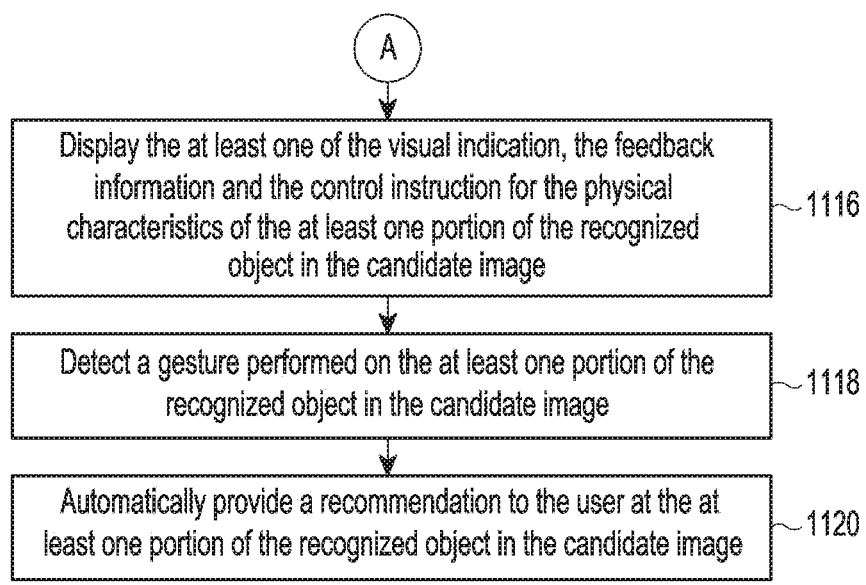

FIGS. 10, 11A, and 11B are flowcharts illustrating a method for determining physical characteristics of objects, according to various embodiments of the disclosure.

Referring to FIG. 10, at operation 1002, the method includes recognizing the object in the candidate image. In an embodiment, the method allows the physical characteristics management engine 110 to recognize the object in the candidate image.

At operation 1004, the method includes extracting the plurality of candidate parameters of the recognized object in the candidate image. In an embodiment, the method allows the physical characteristics management engine 110 to extract the plurality of candidate parameters of the recognized object in the candidate image.

At operation 1006, the method includes determining the physical characteristics of at least one portion of the recognized object in the candidate image by comparing the plurality of candidate parameters with the plurality of reference parameters of the reference object in the reference image. In an embodiment, the method allows the physical characteristics management engine 110 to determine the physical characteristics of at least one portion of the recognized object in the candidate image by comparing the plurality of candidate parameters with the plurality of reference parameters of the reference object in the reference image.

At operation 1008, the method includes storing the physical characteristics of the at least one portion of the recognized object. In an embodiment, the method allows the memory 130 to store the physical characteristics of the at least one portion of the recognized object.

At operation 1010, the method includes determining the geometric parameters of the physical characteristics of the at least one portion of the recognized object. In an embodiment, the method allows the physical characteristics management engine 110 to determine geometric parameters of the physical characteristics of the at least one portion of the recognized object.

At operation 1012, the method includes generating at least one of the visual indication, the feedback information, or the control instruction for the physical characteristics of the at least one portion of the recognized object based on the geometric parameters. In an embodiment, the method allows the physical characteristics management engine 110 to generate at least one of the visual indication, the feedback information, or the control instruction for the physical characteristics of the at least one portion of the recognized object based on the geometric parameters.

At operation 1014, the method includes storing the at least one of the visual indication, the feedback information, or the control instruction for the physical characteristics of the at least one portion of the recognized object in the candidate image. In an embodiment, the method allows the memory 130 to store the at least one of the visual indication, the feedback information, or the control instruction for the physical characteristics of the at least one portion of the recognized object in the candidate image.

At operation 1016, the method includes displaying the at least one of the visual indication, the feedback information, or the control instruction for the physical characteristics of the at least one portion of the recognized object in the candidate image. In an embodiment, the method allows the physical characteristics UI 150 to display the at least one of the visual indication, the feedback information, or the control instruction for the physical characteristics of the at least one portion of the recognized object in the candidate image.

At operation 1018, the method includes sending the at least one of the visual indication, the feedback information, or the control instruction to another electronic device for automatically performing a control operation. In an embodiment, the method allows the action control engine 160 to send the at least one of the visual indication, the feedback information, or the control instruction to another electronic device for automatically performing the control operation.

Referring to FIG. 11A, at operation 1102, the method includes recognizing the object in the candidate image. In an embodiment, the method allows the physical characteristics management engine 110 to recognize the object in the candidate image.

At operation 1104, the method includes extracting the plurality of candidate parameters of the recognized object in the candidate image. In an embodiment, the method allows the physical characteristics management engine 110 to extract the plurality of candidate parameters of the recognized object in the candidate image.

At operation 1106, the method includes determining the physical characteristics of at least one portion of the recognized object in the candidate image by comparing the plurality of candidate parameters with the plurality of reference parameters of the reference object in the reference image. In an embodiment, the method allows the physical characteristics management engine 110 to determine the physical characteristics of at least one portion of the recognized object in the candidate image by comparing the plurality of candidate parameters with the plurality of reference parameters of the reference object in the reference image.

At operation 1108, the method includes storing the physical characteristics of the at least one portion of the recognized object. In an embodiment, the method allows the memory 130 to store the physical characteristics of the at least one portion of the recognized object.

At operation 1110, the method includes determining the geometric parameters of the physical characteristics of the at least one portion of the recognized object. In an embodiment, the method allows the physical characteristics management engine 110 to determine geometric parameters of the physical characteristics of the at least one portion of the recognized object.

At operation 1112, the method includes generating at least one of the visual indication, the feedback information, or the control instruction for the physical characteristics of the at least one portion of the recognized object based on the geometric parameters. In an embodiment, the method allows the physical characteristics management engine 110 to generate at least one of the visual indication, the feedback information, or the control instruction for the physical characteristics of the at least one portion of the recognized object based on the geometric parameters.

At operation 1114, the method includes storing the at least one of the visual indication, the feedback information, or the control instruction for the physical characteristics of the at least one portion of the recognized object in the candidate image. In an embodiment, the method allows the memory 130 to store the at least one of the visual indication, the feedback information, or the control instruction for the physical characteristics of the at least one portion of the recognized object in the candidate image.

Referring to FIG. 11B, at operation 1116, the method includes displaying the at least one of the visual indication, the feedback information, or the control instruction for the physical characteristics of the at least one portion of the recognized object in the candidate image. In an embodiment, the method allows the physical characteristics UI 150 to display the at least one of the visual indication, the feedback information, or the control instruction for the physical characteristics of the at least one portion of the recognized object in the candidate image.

At operation 1118, the method includes detecting the gesture performed on the at least one portion of the recognized object in the candidate image. In an embodiment, the method allows the physical characteristics UI 150 to detect a gesture performed on the at least one portion of the recognized object in the candidate image.

At operation 1120, the method includes automatically providing the recommendation to the user at the at least one portion of the recognized object in the candidate image. In an embodiment, the method allows the physical characteristics recommendation engine 170 to automatically provide the recommendation to the user at the at least one portion of the recognized object in the candidate image.

The various actions, acts, blocks, operations, or the like in the flow diagrams of FIGS. 10, 11A, and 11B may be performed in the order presented, in a different order, or simultaneously. Further, in some embodiments, some of the actions, acts, blocks, operations, or the like may be omitted, added, modified, skipped, or the like without departing from the scope of the disclosure.

Figure 12:
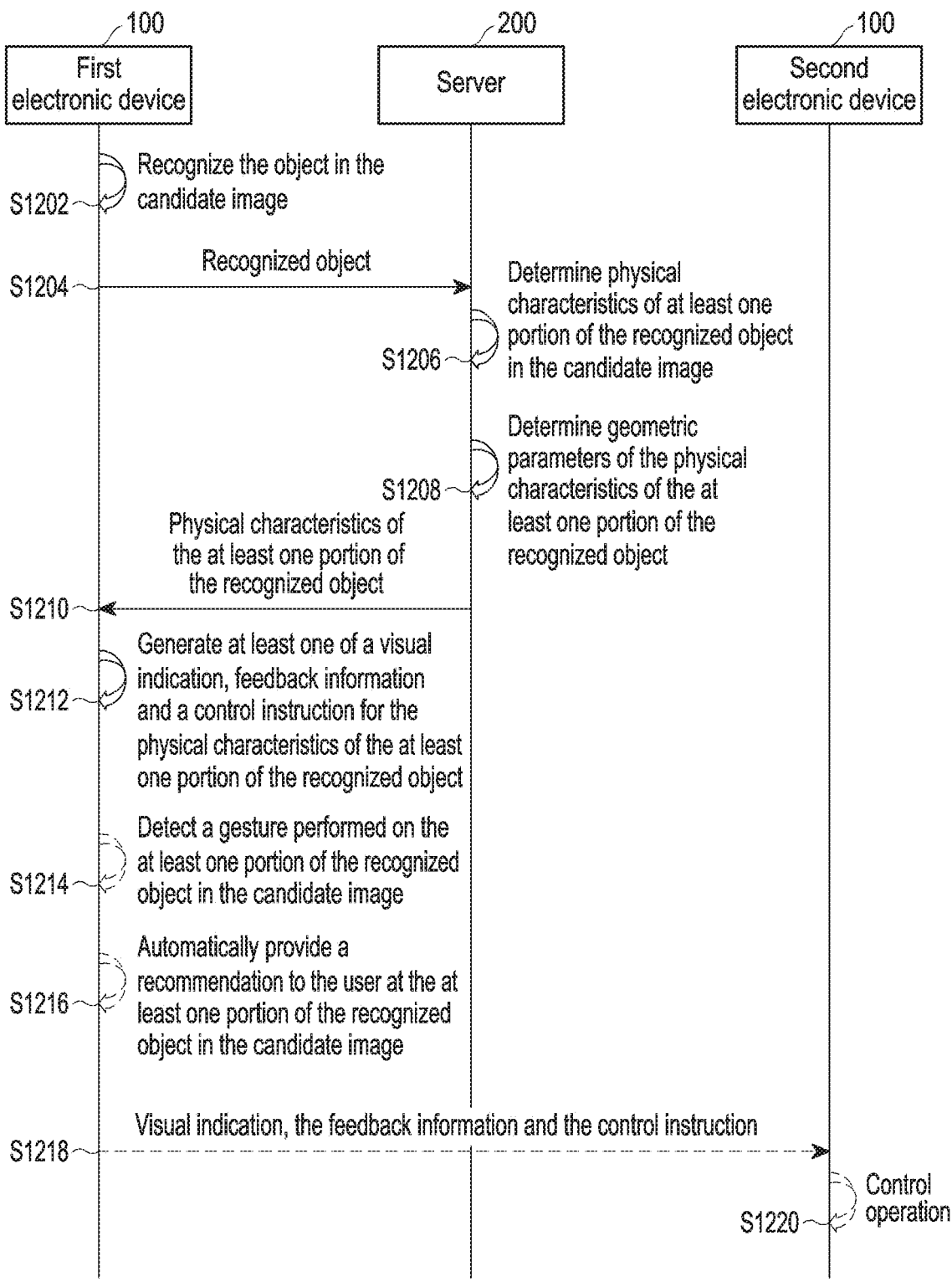
FIG. 12 is a sequence diagram illustrating various operations for determining physical characteristics of objects, according to an embodiment of the disclosure.

FIG. 12 is a sequence diagram illustrating various operations for determining physical characteristics of objects, according to an embodiment of the disclosure.

Referring to FIG. 12, at S1202, the first electronic device 100 recognizes the object in the candidate image. At S1204, the first electronic device 100 sends the recognized object to the server 200. At S1206, the server 200 determines the physical characteristics of at least one portion of the recognized object in the candidate image. At S1208, the server 200 determines the geometric parameters of the physical characteristics of the at least one portion of the recognized object. At S1210, the server 200 sends the physical characteristics of the at least one portion of the recognized object to the electronic device 100. At S1212, the first electronic device 100 generates at least one of the visual indication, the feedback information, or the control instruction for the physical characteristics of the at least one portion of the recognized object. At S1214, the first electronic device 100 detects the gesture performed on the at least one portion of the recognized object in the candidate image.

In an embodiment, at S1216, the first electronic device 100 automatically provides the recommendation to the user at the at least one portion of the recognized object in the candidate image.

In another embodiment, at S1218, the first electronic device 100 sends the visual indication, the feedback information, and the control instruction to the second electronic device. At S1220, the second electronic device performs the control operation.

Figure 13:
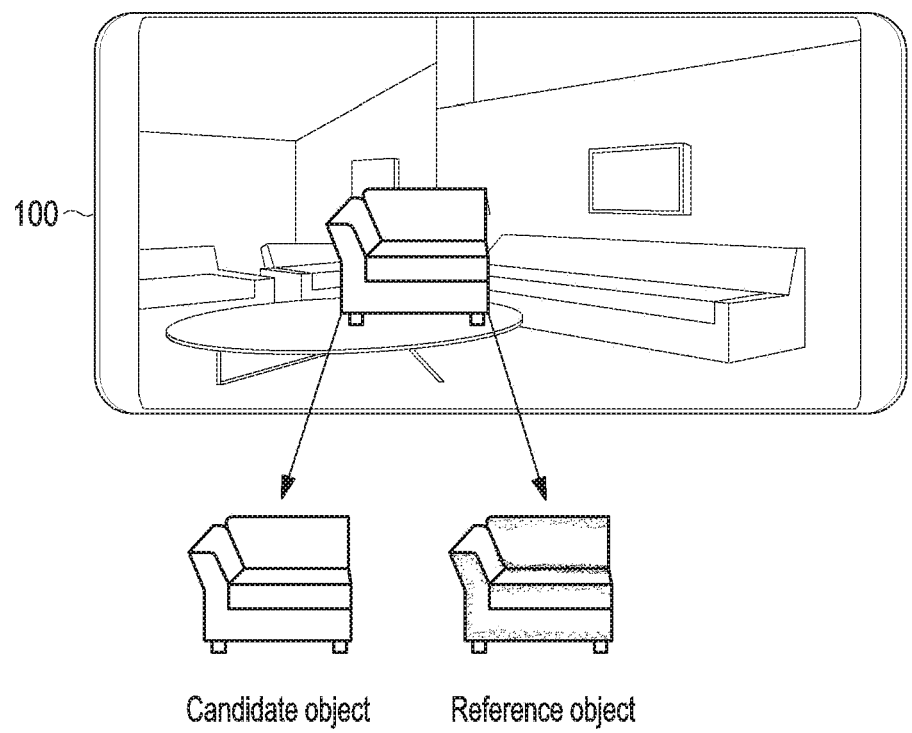
FIG. 13 is an example scenario in which an electronic device determines physical characteristics of a sofa, according to an embodiment of the disclosure.
Figure 13:
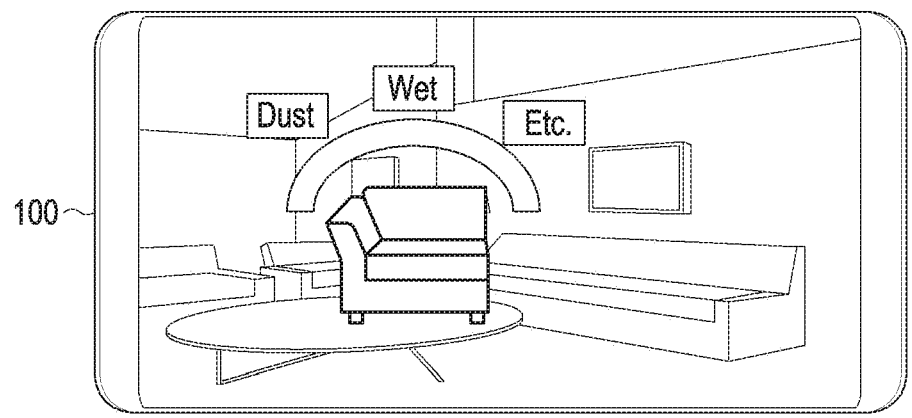

FIG. 13 is an example scenario in which an electronic device determines physical characteristics of a sofa, according to an embodiment of the disclosure.

Referring to FIG. 13, the electronic device 100 captures the image in the home and selects the sofa as the object in the image. Based on the proposed methods, the electronic device 100 determines the physical characteristics the sofa in the image by comparing the plurality of sofa parameters with the plurality of reference sofa parameters of the reference sofa. The reference image is stored in the memory. Further, the electronic device 100 determines the geometric parameters of the physical characteristics of the at least one portion of the recognized sofa. Further, the electronic device 100 generates at least one of the visual indication or the feedback information over the sofa (such as the wet place in sofa, dry place in sofa, dust place in sofa, etc.).

Figure 14A:
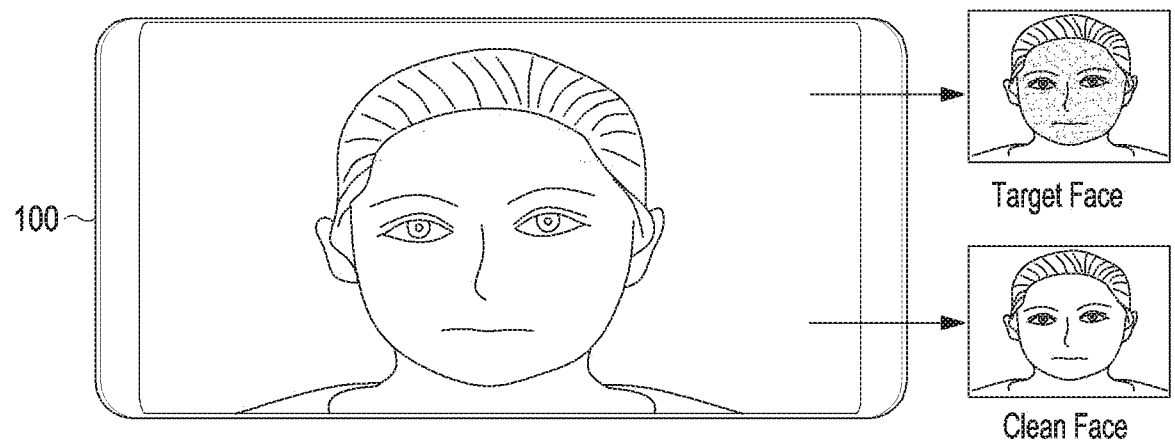
FIGS. 14A and 14B are example scenarios in which an electronic device determines physical characteristics of a human face and provides a recommendation, according to various embodiments of the disclosure.
Figure 14B:
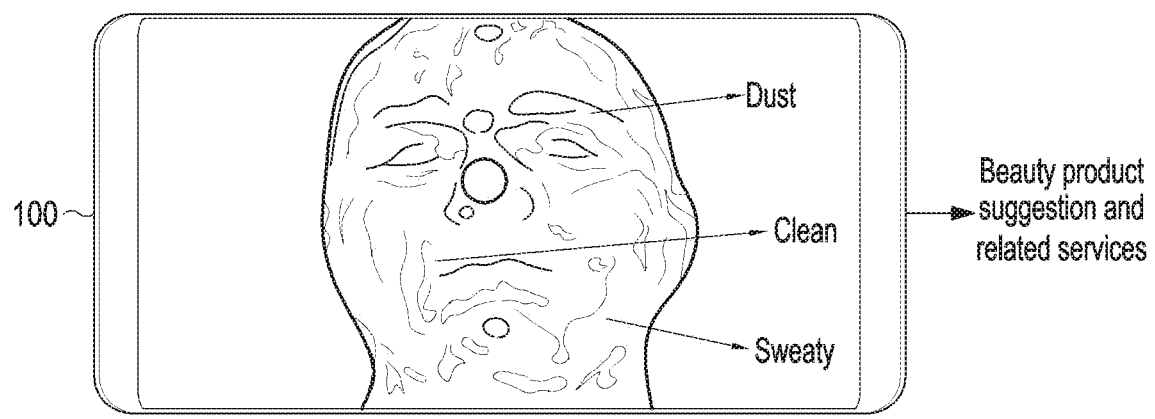

FIGS. 14A and 14B are example scenarios in which an electronic device determines physical characteristics of a human face and provides a recommendation, according to various embodiments of the disclosure.

Referring to FIGS. 14A and 14B, the electronic device 100 captures the human image. Based on the proposed methods, the electronic device 100 determines the physical characteristics the human face by comparing the plurality of face related parameters with the plurality of reference face related parameters of the reference face. Further, the electronic device 100 determines the intensity of the physical characteristics of the human face such as some portions are dust, dry, clean sweaty or the like. Further, the electronic device 100 generates the visual indication and provides beauty product recommendation. In another example, the electronic device 100 generates the visual indication and provides beauty product recommendation based on a heat map procedure.

Figure 15:
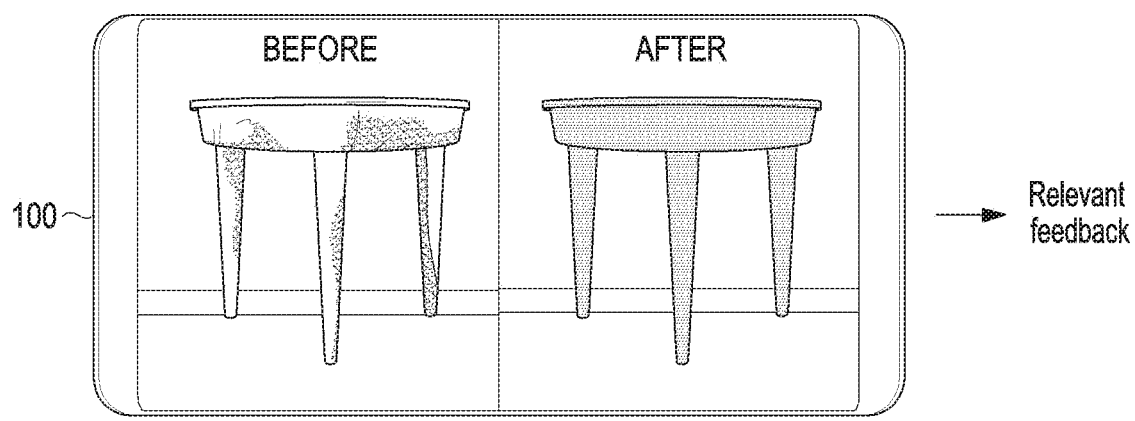
FIG. 15 is an example scenario in which an electronic device determines smoothness and roughness of a table after painting, according to an embodiment of the disclosure.

FIG. 15 is an example scenario in which an electronic device determines smoothness and roughness of a table after painting, according to an embodiment of the disclosure.

Referring to FIG. 15, the user paints on the table. Based on the proposed methods, after painting, the user is able to obtain the level of smoothness and roughness of the table without touching the table.

Figure 16:
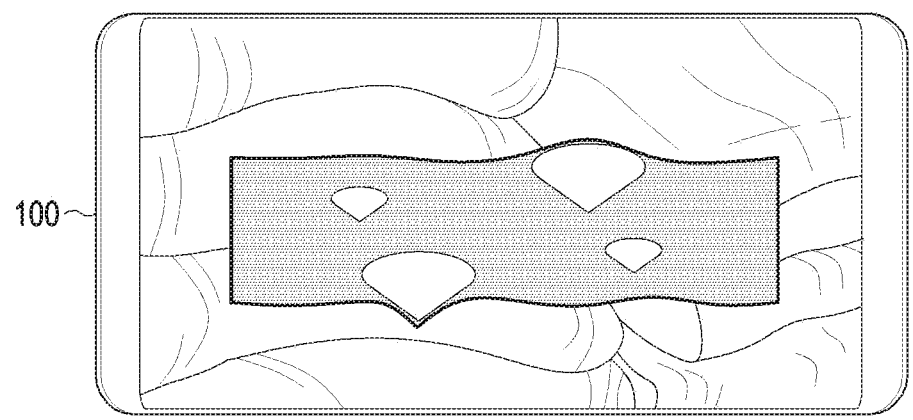
FIG. 16 is an example scenario in which an electronic device determines a moisture level, a hardness level, and a dust level of a cloth, according to an embodiment of the disclosure.
Figure 17E:
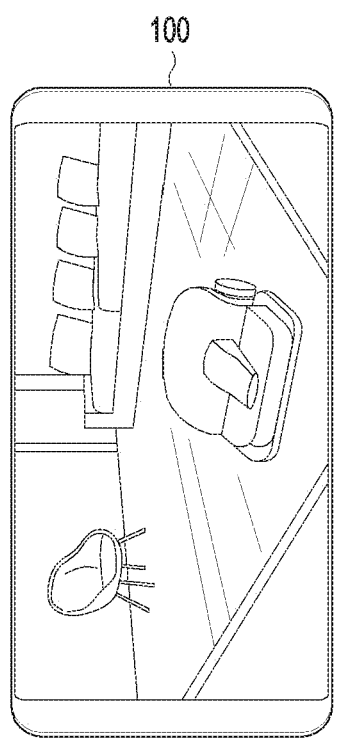
Figure 17F:
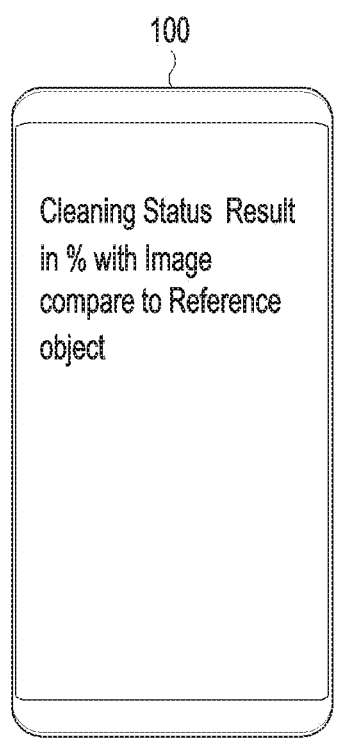
Figure 18A:
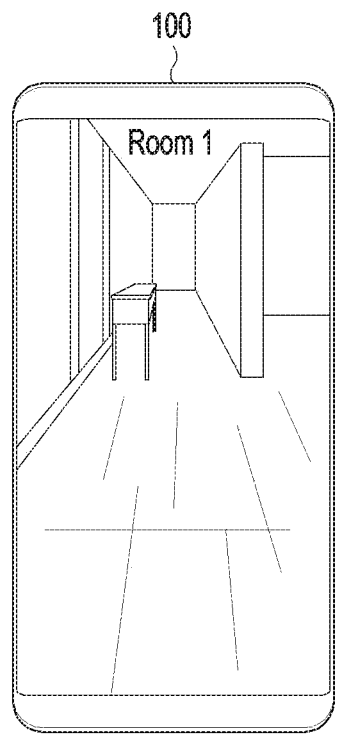
Figure 18B:
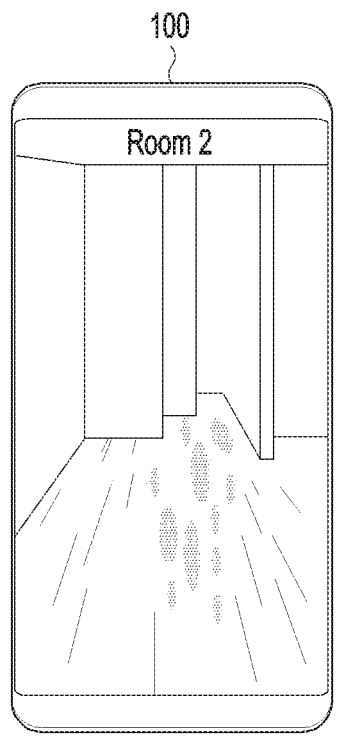
Figure 18C:
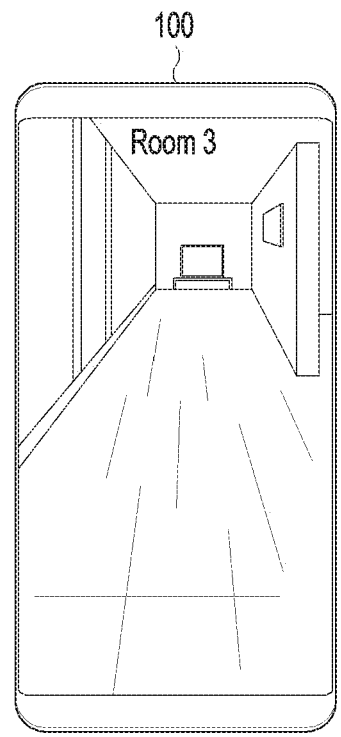
Figure 18D:
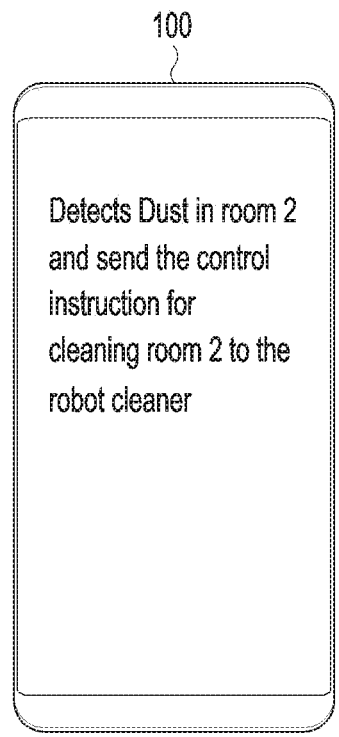
Figure 18E:
Figure 18F:
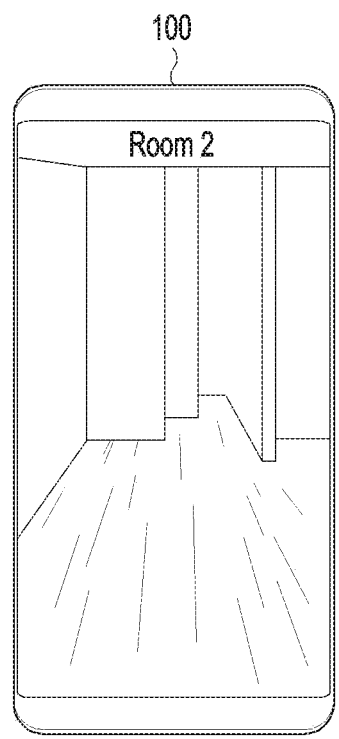
Figure 18G:
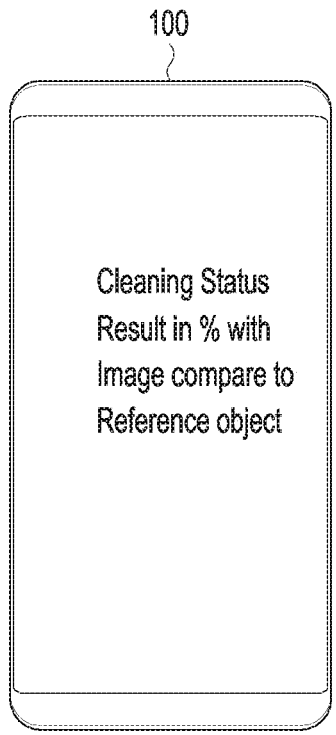

FIG. 16 is an example scenario in which an electronic device determines a moisture level, a hardness level, and a dust level of a cloth, according to an embodiment of the disclosure.

Referring to FIG. 16, woolen cloths are kept in a box for a long time and a user of the electronic device 100 wishes to know a condition of the woolen cloths. Based on the proposed methods, the user of the electronic device 100 obtains the visual/haptic feedback and alerts about the moisture level, hardness level, and dust level. In another example, if the user wishes to buy the cloth from an online site, based on the proposed methods, the user of the electronic device 100 provides a feedback (e.g., the quality of the cloth, material of the cloth, hardness level, or the like) about the cloth.

FIGS. 17A to 17F and 18A to 18G are example scenarios in which an electronic device performs a cleaning operation on a floor, according to various embodiments of the disclosure.

Referring to FIGS. 17A to 17F, the user of the electronic device 100 detects the dirtiness on the floor and sends the visual notification to the user. Based on the user input, the electronic device 100 sends a cleaning instruction indicating the cleaning level to the robot cleaner/smart vacuum cleaner. The cleaning level can be high level cleaning, a low level cleaning, and medium level cleaning. The robot cleaner/smart vacuum cleaner receives the instruction from the electronic device 100 and performs the cleaning operations on the floor. After completing the cleaning operations on the floor, the robot cleaner/smart vacuum cleaner sends the visual notification to the user about the cleanliness of the floor.

In another example, the user of the electronic device 100 detects the dirtiness on the floor and sends the visual notification to the user. Based on the user input, the electronic device 100 sends a cleaning instruction along with the cleaning level (e.g., smart cleaning, quick cleaning, an intelligent cleaning, or the like) to the robot cleaner/smart vacuum cleaner. The robot cleaner/smart vacuum cleaner receives the instruction from the electronic device 100 and performs the cleaning operations on the floor based on the cleaning level. After completing the cleaning operations on the floor, the robot cleaner/smart vacuum cleaner sends the visual notification to the user about the cleanliness of the floor.

In another example, the floor condition is checked and the wet condition is detected so that a wet robot cleaning mode is set for the robot cleaner. Accordingly, the robot cleaner performs the cleaning operations.

Referring to FIGS. 18A to 18G, the user of the electronic device 100 detects dust in the room 2 and no dust in the room 1 and room 3, so that the electronic device 100 sends the visual notification to the robot cleaner about the dust in the room 2. Based on the detection, the electronic device 100 sends a cleaning instruction to the robot cleaner. The robot cleaner receives the instruction from the electronic device 100 and performs the cleaning operations in the room 2. After completing the cleaning operations in the room 2, the robot cleaner sends the visual notification to the user about the cleanliness of the room 2.

Figure 19:
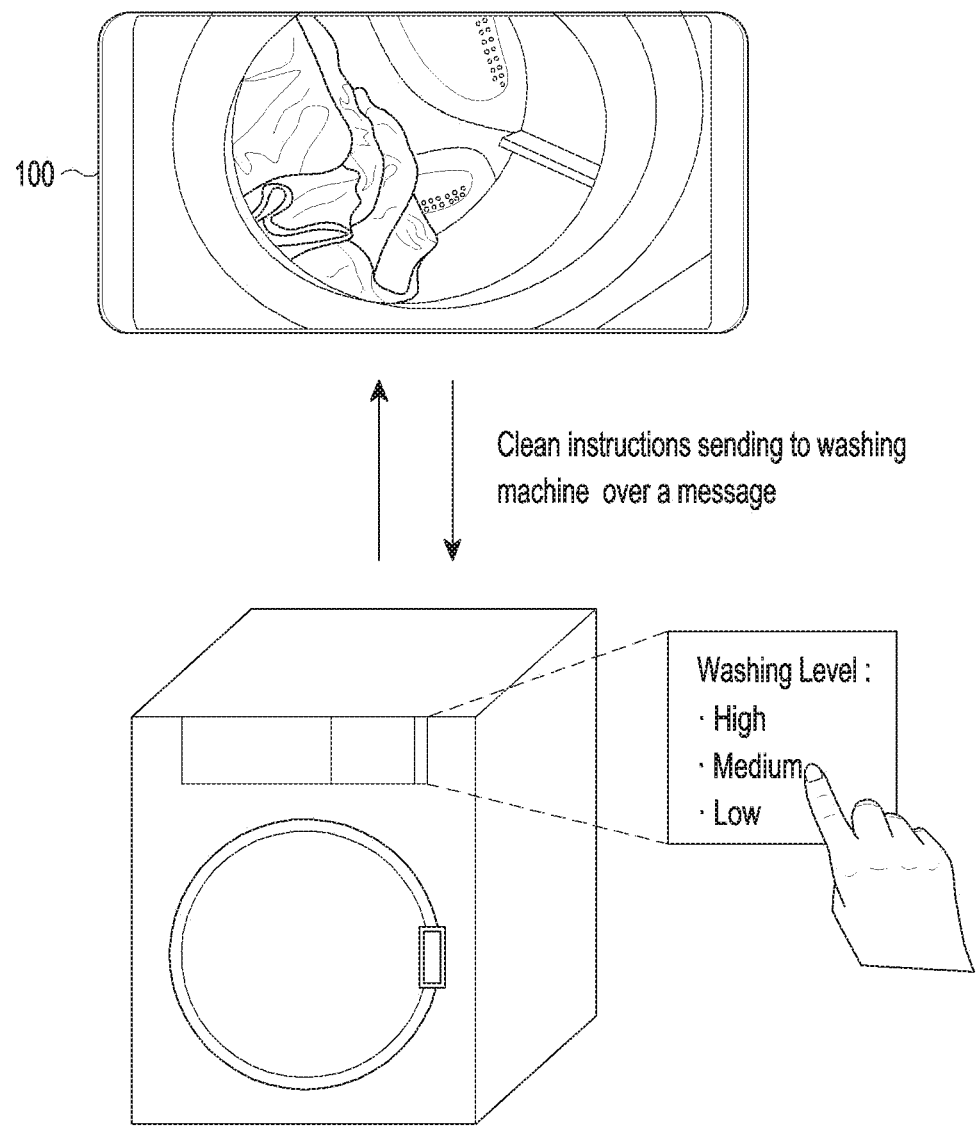
FIG. 19 is an example scenario in which an electronic device sends a cleaning instruction to a smart washing machine, according to an embodiment of the disclosure.
Figure 20A:
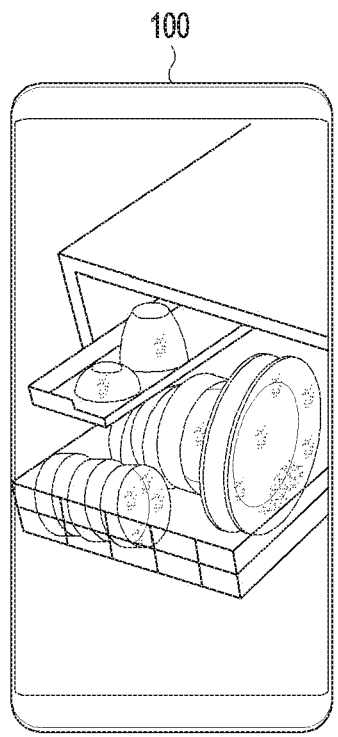
FIGS. 20A, 20B, 20C, and 20D are example scenarios in which an electronic device sends a cleaning instruction to a smart dishwasher, according to various embodiments of the disclosure.
Figure 20B:
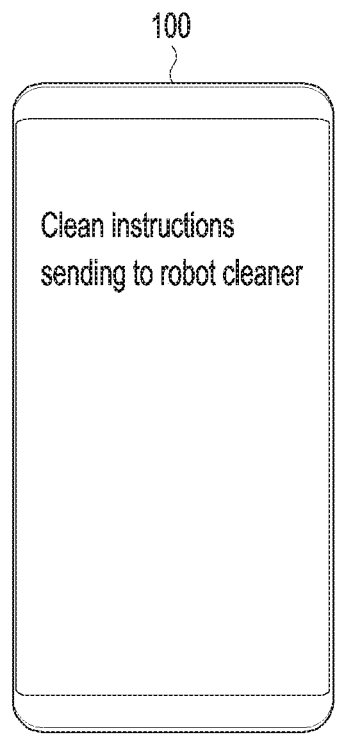
Figure 20C:
Figure 20D:
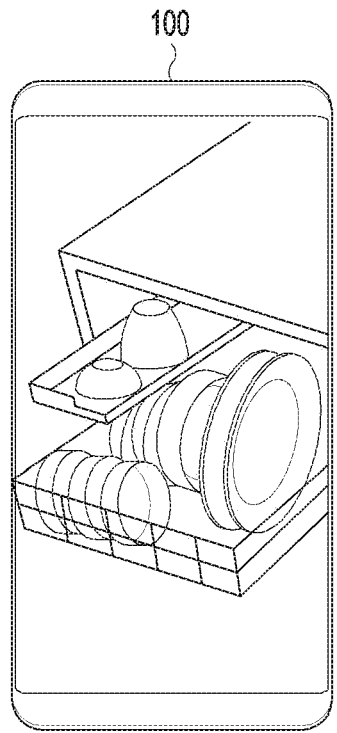

FIG. 19 is an example scenario in which an electronic device sends a cleaning instruction to a smart washing machine, according to an embodiment of the disclosure.

Referring to FIG. 19, before washing the clothes, the user of the electronic device 100 captures a photo of the clothes and detects that the clothes are dirty. Based on the detection, the electronic device 100 sends the cleaning instruction to the smart washing machine over a message (e.g., voice message, SMS or the like). Based on the cleaning instruction, the smart washing machine sets the washing instruction for cleaning the clothes.

FIGS. 20A to 20D are example scenarios in which an electronic device sends a cleaning instruction to a smart dishwasher, according to various embodiments of the disclosure.

Referring to FIGS. 20A to 20D, before washing the plates, the user of the electronic device 100 captures a photo of the plates and detects that the plates are dirty. Based on the detection, the electronic device 100 sends the cleaning instruction to the robot cleaner. Based on the cleaning instruction, the robot cleaner cleans the plates using a power cleaning mode, a smart cleaning level mode, and an intelligent cleaning level mode. Further, the robot cleaner cleans the plates and sends a visual feedback or a tactile feedback to the electronic device 100.

In another example, before washing the plates, the user of the electronic device 100 captures a photo of the plates and detects that the plates are dirty. Based on the detection, the electronic device 100 sends a cleaning instruction to a smart dishwasher. Based on the cleaning instruction, the smart dishwasher cleans the plates using a power cleaning mode, a smart cleaning level mode, and an intelligent cleaning level mode. Further, the smart dishwasher cleans the plates and sends the visual feedback or the tactile feedback to the electronic device 100.

In another example, before washing the plates, the user of the electronic device 100 captures a photo of the plates and detects that the plates are dirty. Based on the detection, the electronic device 100 sends a cleaning instruction to the smart dishwasher. Accordingly, the smart dishwasher can clean the plates.

Figure 21A:
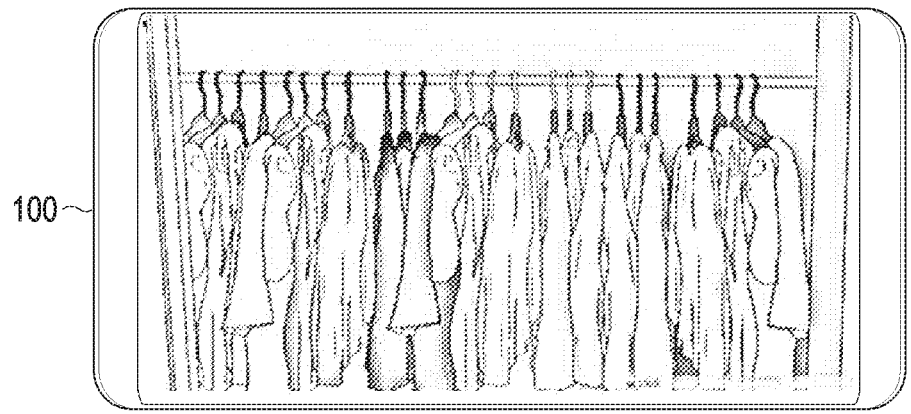
FIGS. 21A and 21B are example scenarios in which an electronic device indicates a cloth condition, according to various embodiments of the disclosure.
Figure 21B:
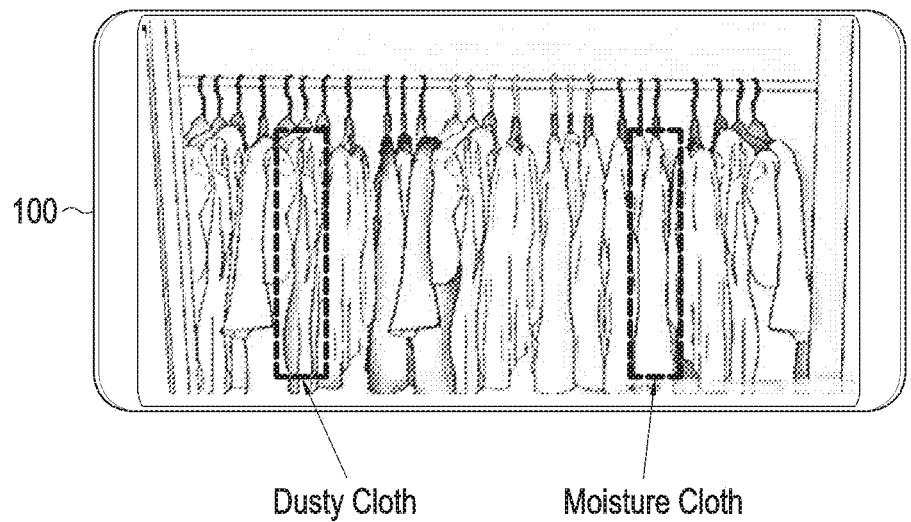

FIGS. 21A and 21B are example scenarios in which an electronic device indicates a cloth condition, according to various embodiments of the disclosure.

Referring to FIGS. 21 and 12B, the user of the electronic device 100 wishes to buy the cloth and captures a picture of the cloth. Based on the proposed methods, the electronic device 100 provides the visual feedback or the tactile feedback about the cloth condition. Gray color thick shape indicates moisture on the cloth. Black color thin shape indicates dust on the cloth.

Figure 22:
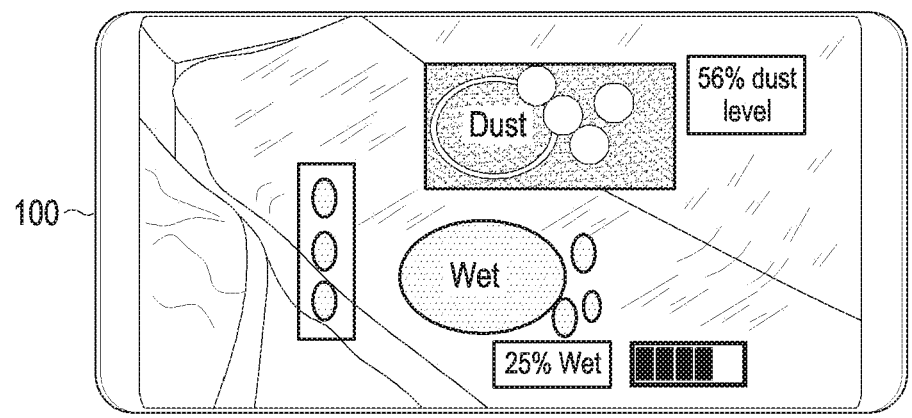
FIGS. 22 and 23 are example scenarios in which an electronic device provides a recommendation in the form of intensity level and a color variation, according to various embodiments of the disclosure.
Figure 23:
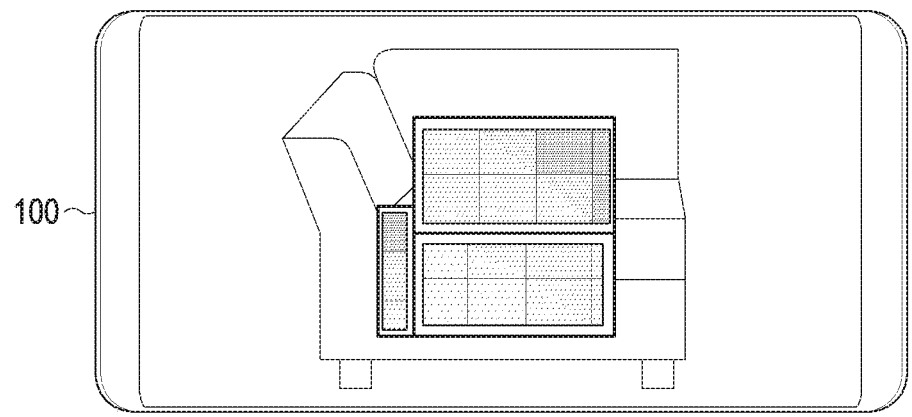

FIGS. 22 and 23 are example scenarios in which an electronic device provides a recommendation in the form of intensity level and a color variation, according to various embodiments of the disclosure.

Referring to FIG. 22, the electronic device 100 provides a recommendation in the form of an intensity level.

Referring to FIG. 23, the electronic device 100 provides a recommendation in the form a color variation.

In an example, the UI can be shown to the user as a cascaded intermediate UI. As an example, a dust/wet area may be shown in context of a ratio, a quality, or an area of dust/wet. A color may also be shown in the cascaded intermediate UI. The cascaded intermediate UI shows a location where the sofa is dusty and where the sofa is wet. The cascaded intermediate UI generates a related icon as per category of wet or dust. In another example, the cascaded intermediate UI provides an intensity for marking a quantity of the physical characteristics using a meter indication, a level bar, or a percentage symbol. In another example, the cascaded intermediate UI indicates a classification icon on the area/identified area. The identified area is marked with a boundary and shown in the UI. The related icons can be shown in various shapes, sizes, colors, and areas as per density.

In another example, the cascaded intermediate UI can show and inform a level intensity of dust and also 100% of total sofa area includes 35% dust+35% wet+30% normal area. Based on pixel value differences and pixel area location, the type of classification is named and accordingly area/box and shape of area is marked on the cascaded intermediate UI.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for determining a physical characteristic of an object by an electronic device, the method comprising:
identifying a first object in a first image;
determining a plurality of first parameters of the first object;
determining a physical characteristic of the first object by comparing the plurality of first parameters with a plurality of second parameters of a second object in a second image, wherein a type of the first object corresponds to a type of the second object, and the physical characteristic of the first object is intrinsic to the first object;
determining at least one parameter related to the physical characteristic of the first object based on the physical characteristic of the first object; and
providing visual indication or control instruction related to the physical characteristic of the first object based on the determined at least one parameter.

2. The method of claim 1, further comprising:
determining, by the electronic device, geometric parameters of physical characteristics of at least one portion of the first object;
generating, by the electronic device, at least one of a visual indication, feedback information, or a control instruction for the physical characteristics of the at least one portion of the first object based on the geometric parameters; and
storing or displaying, by the electronic device, the at least one of the visual indication, the feedback information, or the control instruction for the physical characteristics of the at least one portion of the first object in a candidate image, or
transmitting the at least one of the visual indication, the feedback information, or the control instruction to another electronic device for automatically performing a control operation.

3. The method of claim 2, further comprising:
detecting a gesture performed on the at least one portion of the first object in the candidate image; and
automatically providing a recommendation to a user at the at least one portion of the first object in the candidate image,
wherein the recommendation comprises at least one of an indication of an intensity level about the comparison, a color variation about the comparison, or a shape change about the comparison.

4. The method of claim 2, wherein the geometric parameters comprise a location, a size, a shape, or an intensity of the physical characteristics of the at least one portion of the first object in the candidate image.

5. The method of claim 2, wherein the determining of the geometric parameters comprises:
preprocessing the physical characteristics of the at least one portion of the first object using at least one of a box generator or a shape generator of a cascaded artificial intelligence model; and
determining the geometric parameters from the preprocessed physical characteristics of the at least one portion of the first object using the cascaded artificial intelligence model.

6. The method of claim 2, wherein the generating of the at least one of the visual indication, the feedback information, or the control instruction comprises:
inputting conditional labels into a generator and a discriminator using an advanced generative adversarial network (GAN) model;
determining a level of intensity of the geometric parameters based on the GAN model;

generating realistic samples of the physical characteristics of the at least one portion of the first object based on the conditional labels; and generating at least one of the visual indication, the feedback information, or the control instruction for the physical characteristics of the at least one portion of the first object based on the realistic samples.

7. The method of claim 1, wherein a plurality of candidate parameters comprise at least one of metadata information about the first object in a candidate image, pixel information of each portion of the first object in the candidate image, a location of each portion of the first object in the candidate image, or a color, an intensity, a shape, or a size of each pixel of each portion of the first object in the candidate image, and wherein a plurality of reference parameters comprise at least one of metadata information about a reference object in a reference image, pixel information of each portion of the reference object in the reference image, a location of each portion of the reference object in the reference image, or a color, an intensity, a shape, or a size of each pixel of each portion of the reference object in the reference image.

8. The method of claim 1, wherein a reference object represents a same or a similar characteristic of the object of a candidate image, and wherein the physical characteristic of the first object represents an intrinsic property of the first object.

9. The method of claim 1, wherein the extracting of a plurality of candidate parameters comprises:

preprocessing a candidate image for at least one of removal of noise from the candidate image or correcting processing parameters of the first object in the candidate image using at least one of an artificial intelligence model or a machine learning model; and extracting the plurality of candidate parameters from the preprocessed candidate image using at least one of the artificial intelligence model or the machine learning model.

10. The method of claim 1, wherein the determining of the physical characteristic of the first object comprises:

performing an analysis of a plurality of candidate parameters with a plurality of reference parameters using at least one of an artificial intelligence model or a machine learning model;

identifying differences between the plurality of candidate parameters and the plurality of reference parameters based on the analysis; and determining the physical characteristic of the first object based on the differences.

11. An electronic device for determining a physical characteristic of an object, the electronic device comprising:

a memory;

at least one processor; and a physical characteristics management engine, coupled to the memory and the at least one processor, configured to:

identify a first object in a first image, determine a plurality of first parameters of the first object, determine a physical characteristic of the first object by comparing the plurality of first parameters with a plurality of second parameters of a second object in a second image, wherein a type of the first object corresponds to a type of the second object, and the physical characteristic of the first object is intrinsic to the first object, determine at least one parameter related to the physical characteristic of the first object based on the physical characteristic of the first object, and provide visual indication or control instruction related to the physical characteristic of the first object based on the determined at least one parameter.

12. The electronic device of claim 11, wherein the physical characteristics management engine is further configured to:

determine geometric parameters of physical characteristics of at least one portion of the first object, generate at least one of a visual indication, feedback information, or a control instruction for the physical characteristics of the at least one portion of the first object based on the geometric parameters, and store or display the at least one of the visual indication, the feedback information, or the control instruction for the physical characteristics of the at least one portion of the first object in a candidate image, or transmit the at least one of the visual indication, the feedback information, or the control instruction to another electronic device for automatically performing a control operation.

13. The electronic device of claim 12, wherein a plurality of candidate parameters comprise at least one of metadata information about the first object in the candidate image, pixel information of each portion of the first object in the candidate image, a location of each portion of the first object in the candidate image, or a color, an intensity, a shape, or a size of each pixel of each portion of the first object in the candidate image, and wherein a plurality of reference parameters comprise at least one of metadata information about a reference object in a reference image, pixel information of each portion of the reference object in the reference image, a location of each portion of the reference object in the reference image, or a color, an intensity, a shape, or a size of each pixel of each portion of the reference object in the reference image.

14. The electronic device of claim 12, wherein a reference object represents a same or a similar characteristic of the object of the candidate image, and wherein the physical characteristic of the first object represents an intrinsic property of the first object.

15. The electronic device of claim 12, wherein the physical characteristics management engine is further configured to:

preprocess the candidate image for at least one of removal of noise from the candidate image or correcting processing parameters of the first object in the candidate image using at least one of an artificial intelligence model or a machine learning model; and extract a plurality of candidate parameters from the first object in the preprocessed candidate image using at least one of the artificial intelligence model or the machine learning model.

16. The electronic device of claim 12, wherein the physical characteristics management engine is further configured to:

perform an analysis of a plurality of candidate parameters with a plurality of reference parameters using at least one of an artificial intelligence model or a machine learning model;

identify differences between the plurality of candidate parameters and the plurality of reference parameters based on the analysis; and determine the physical characteristic of the first object based on the differences.

17. The electronic device of claim 12, wherein the geometric parameters comprise a location, a size, a shape, or an intensity of the physical characteristics of the at least one portion of the first object in the candidate image.

18. The electronic device of claim 12, wherein the physical characteristics management engine is further configured to:

preprocess the physical characteristics of the at least one portion of the first object using at least one of a box generator or a shape generator of a cascaded artificial intelligence model; and determine the geometric parameters from the preprocessed physical characteristics of the at least one portion of the first object using the cascaded artificial intelligence model.

19. The electronic device of claim 12, wherein the physical characteristics management engine is further configured to:

input conditional labels into a generator and a discriminator using an advanced generative adversarial network (GAN) model;

determine a level of intensity of the geometric parameters based on the GAN model;

generate realistic samples of the physical characteristics of the at least one portion of the first object based on the conditional labels; and generate at least one of the visual indication, the feedback information, or the control instruction for the physical characteristics of the at least one portion of the first object based on the realistic samples.

20. The electronic device of claim 11, wherein the physical characteristics management engine is further configured to:

detect a gesture performed on at least one portion of the first object in a candidate image, and automatically provide a recommendation to a user at the at least one portion of the first object in the candidate image, wherein the recommendation comprises at least one of indication of an intensity level about the comparison, a color variation about the comparison, or a shape change about the comparison.

* * * * *